US012589477B2

(12) United States Patent
Bush et al.

(10) Patent No.: US 12,589,477 B2
(45) Date of Patent: Mar. 31, 2026

(54) MULTI-HEADED POWER TOOL AND FASTENING SYSTEM FOR SAME AND SYSTEMS FOR FASTENING HEADS THEREON

(71) Applicant: STANLEY BLACK & DECKER, INC., New Britain, CT (US)

(72) Inventors: Dennis A. Bush, Dillsburg, PA (US); James Batterden, Timonium, MD (US); Matthew Masison, Towson, MD (US); Lukas Purasson, Towson, MD (US); Joseph P. Kelleher, Parkville, MD (US)

(73) Assignee: Stanley Black & Decker Inc., New Britain, CT (US)

( * ) Notice: Subject to any disclaimer, the term of this patent is extended or adjusted under 35 U.S.C. 154(b) by 0 days.

(21) Appl. No.: 18/960,691

(22) Filed: Nov. 26, 2024

(65) Prior Publication Data

US 2025/0178175 A1 Jun. 5, 2025

Related U.S. Application Data

(60) Provisional application No. 63/645,706, filed on May 10, 2024, provisional application No. 63/604,689, filed on Nov. 30, 2023.

(51) Int. Cl.

*B25F 3/00* (2006.01)
*B25F 5/02* (2006.01)
*B25F 5/00* (2006.01)

(52) U.S. Cl.

CPC .................. *B25F 3/00* (2013.01); *B25F 5/02* (2013.01); *B25F 5/001* (2013.01)

(58) Field of Classification Search

CPC ............... B25F 3/00; B25F 5/001; B25F 5/02
See application file for complete search history.

(56) References Cited

U.S. PATENT DOCUMENTS 4,489,792 A 12/1984 Fahim et al.
4,784,542 A 11/1988 Tack et al.
(Continued)

FOREIGN PATENT DOCUMENTS

CN 204076204 U 1/2015
CN 204935583 U 1/2016
(Continued)

OTHER PUBLICATIONS

Patent Cooperation Treaty, International Search Report and Written Opinion issued in International Patent Application No. PCT/US2024/057531, Mar. 11, 2025, pp. 1-28.

*Primary Examiner* — Eyamindae C Jallow
(74) *Attorney, Agent, or Firm* — Brake Hughes Bellermann LLP

(57) ABSTRACT

A power tool includes a head interface coupled to a forward end of an output shaft and a tool head element for engagement on the head interface. The tool head element has a housing including an input shaft configured to removably couple with the output shaft and a collar comprising locking elements. Each locking element is biased inwardly towards the input shaft by biasing elements. Upon attachment of the tool head element to the head interface, the locking elements are aligned into a circumferential groove of the head interface and held by the biasing elements therein to engage the tool head element onto the head interface and establish a drive connection between the output shaft and input shaft. Thus, when a motor and transmission assembly of the tool is operated, the input shaft rotates with the output shaft about the axis and thus drives the tool head element.

14 Claims, 29 Drawing Sheets

(56) References Cited

U.S. PATENT DOCUMENTS 4,824,298 A 4/1989 Lippacher et al.
5,197,749 A 3/1993 Moore et al.
5,207,528 A 5/1993 Ludwig
5,409,243 A 4/1995 Shadeck et al.
5,658,193 A 8/1997 Mccambridge
5,711,380 A 1/1998 Chen
6,056,298 A 5/2000 Williams
7,051,568 B2 5/2006 Ciotti
7,596,872 B2 10/2009 Clarke et al.
7,712,746 B2 5/2010 Manschitz et al.
7,806,636 B2 10/2010 Puzio
8,201,835 B2 6/2012 Haas
8,322,457 B2 12/2012 Mok et al.
8,403,340 B2 3/2013 Valiani
8,608,413 B2 12/2013 Miyanaga
8,695,725 B2 4/2014 Lau et al.
8,770,898 B2 7/2014 Nordlin
9,144,847 B2 9/2015 Tseng
9,156,093 B2 10/2015 Meyers
9,162,353 B2 10/2015 Ciotti
9,346,096 B2 5/2016 Ziliani et al.
9,364,942 B2 6/2016 Puzio et al.
9,388,885 B2 7/2016 Hartranft et al.
9,573,263 B2 2/2017 Bowles et al.
9,579,782 B2 2/2017 Tussing
9,718,135 B2 8/2017 Schenk
9,751,176 B2 9/2017 Mcroberts et al.
9,764,452 B2 9/2017 Koch
10,011,008 B2 7/2018 Herr et al.
10,265,816 B2 4/2019 Ebeling
10,442,009 B2 10/2019 Sergyeyenko et al.
10,722,949 B2 7/2020 Kreuzer
10,800,015 B2 10/2020 Zhang
11,034,002 B2 6/2021 Gordon et al.
11,130,243 B2 9/2021 Son
11,426,850 B2 8/2022 Lefavour et al.
11,453,108 B2 9/2022 Rubens et al.
11,534,897 B2 12/2022 Kaye, Jr.
2001/0023525 A1 9/2001 Driessen
2002/0020972 A1 2/2002 Yaksich
2002/0192043 A1 12/2002 Lin
2003/0066667 A1* 4/2003 Zhang ........................ B25F 3/00 173/217
2008/0136125 A1 6/2008 Hirt et al.
2010/0108338 A1 5/2010 Hirt
2010/0281695 A1 11/2010 Nie
2011/0127731 A1 6/2011 Woecht et al.
2011/0233878 A1 9/2011 Wan et al.
2011/0272172 A1 11/2011 Lau et al.
2011/0309589 A1 12/2011 Maras
2012/0024556 A1 2/2012 Zhu
2012/0319398 A1 12/2012 Schweizer et al.
2013/0008677 A1* 1/2013 Huifu ........................ B25D 1/00 29/401.1
2013/0020106 A1* 1/2013 Kuehne ..................... B25F 5/02 173/214
2013/0093142 A1 4/2013 Saur et al.
2013/0093149 A1 4/2013 Saur et al.
2013/0228355 A1* 9/2013 Kuehne ..................... B25F 5/02 173/29
2013/0237367 A1 9/2013 Roehm
2013/0333907 A1 12/2013 Hecht et al.
2014/0020919 A1 1/2014 Dvorak et al.
2014/0131958 A1 5/2014 Roehm et al.
2014/0131959 A1 5/2014 Tussing
2014/0133898 A1 5/2014 Tussing
2014/0182873 A1 7/2014 Fankhauser et al.
2014/0332243 A1* 11/2014 Baskar ...................... B25F 5/02 173/29
2014/0346744 A1 11/2014 Herr et al.
2014/0367928 A1 12/2014 Yew et al.
2015/0040341 A1 2/2015 Wiedemann et al.
2015/0090471 A1 4/2015 Tao
2015/0115550 A1 4/2015 Schenk et al.
2015/0115554 A1 4/2015 Tussing
2015/0174752 A1 6/2015 Lu et al.
2015/0209945 A1 7/2015 Ulrich et al.
2015/0266170 A1 9/2015 Weller
2015/0314375 A1 11/2015 Schenk
2015/0321305 A1 11/2015 Saur et al.
2015/0343583 A1 12/2015 Mcroberts et al.
2016/0082583 A1 3/2016 Sergyeyenko et al.
2016/0158929 A1 6/2016 Brennenstuhl et al.
2016/0227694 A1* 8/2016 Bermudez .............. A01G 3/062
2016/0303729 A1 10/2016 Blum et al.
2016/0346911 A1 12/2016 Blum et al.
2017/0028543 A1 2/2017 Chen et al.
2018/0029214 A1* 2/2018 Brennenstuhl ........ B23B 45/008
2018/0272516 A1 9/2018 Hecht et al.
2018/0345475 A1 12/2018 Qian
2018/0361556 A1 12/2018 Junkersdorf et al.
2018/0370009 A1 12/2018 Junkersdorf et al.
2019/0015963 A1 1/2019 Moylan et al.
2019/0160639 A1 5/2019 Lefavour et al.
2019/0184528 A1 6/2019 Herr et al.
2019/0217400 A1 7/2019 Ding et al.
2019/0217459 A1 7/2019 Gregorich et al.
2019/0291247 A1 9/2019 Gordon et al.
2019/0308309 A1* 10/2019 Gregorich ............. B23B 45/003
2019/0329394 A1 10/2019 Fielitz et al.
2019/0329395 A1 10/2019 Fielitz et al.
2019/0329396 A1 10/2019 Fielitz
2019/0389046 A1 12/2019 Crowell et al.
2020/0180090 A1 6/2020 Fehrenbacher et al.
2020/0230795 A1 7/2020 Carlson et al.
2020/0384625 A1 12/2020 Zugen et al.
2021/0039241 A1 2/2021 Baumann et al.
2021/0101235 A1 4/2021 Schneider
2021/0138617 A1 5/2021 Czirjak et al.
2021/0169211 A1 6/2021 Rubens et al.
2021/0252680 A1 8/2021 Herr et al.
2022/0023957 A1 1/2022 Botello
2022/0032414 A1 2/2022 Galli et al.
2022/0143858 A1 5/2022 Moss et al.
2022/0297205 A1 9/2022 Sanogo et al.
2022/0331942 A1 10/2022 Lourenco et al.
2023/0108174 A1 4/2023 Li et al.

FOREIGN PATENT DOCUMENTS

CN 206048102 U 3/2017
CN 206732937 U 12/2017
CN 209021994 U 6/2019
CN 111230813 A 6/2020
CN 210909152 U 7/2020
CN 113001476 A 6/2021
CN 215393693 U 1/2022
DE 4019727 A1 2/1992
DE 4105515 A1 8/1992
DE 19621610 A1 12/1997
DE 19818148 A1 10/1999
DE 10109956 A1 11/2001
DE 102007036312 A1 2/2009
DE 202009014717 U1 1/2010
DE 202010005370 U1 8/2010
DE 102009034964 A1 3/2011
DE 202011051408 U1 12/2011
DE 102012220835 A1 5/2014
DE 102012220905 A1 5/2014
DE 202013100891 U1 6/2014
DE 202013008724 U1 1/2015
DE 102014207713 A1 10/2015
DE 102015204806 A1 12/2015
DE 202016102081 U1 5/2016
DE 102015200826 A1 7/2016
DE 102015200828 A1 7/2016
DE 102015200831 A1 7/2016
DE 202016104002 U1 8/2016
DE 102015206622 A1 10/2016
DE 102016104075 A1 9/2017
DE 202018103045 U1 6/2018
DE 102014112288 B4 10/2018
DE 102017004200 A1 10/2018

(56) References Cited

FOREIGN PATENT DOCUMENTS

| | | | | |
|---|---|---|---|---|
| DE | 102017222832 | A1 | 6/2019 | |
| DE | 102017222862 | A1 | 6/2019 | |
| DE | 102018219934 | A1 | 6/2019 | |
| DE | 102019131292 | A1 | 5/2021 | |
| EP | 0734296 | A1 | 12/1993 | |
| EP | 1084798 | A2 | 3/2001 | |
| EP | 1236538 | A2 | 9/2002 | |
| EP | 1375080 | A2 | 1/2004 | |
| EP | 1391269 | A2 | 2/2004 | |
| EP | 1749620 | A1 | 2/2007 | |
| EP | 1941973 | A2 | 7/2008 | |
| EP | 2338644 | A2 * | 6/2011 | ................ B25F 3/00 |
| EP | 2363246 | A2 | 9/2011 | |
| EP | 2383076 | A2 | 11/2011 | |
| EP | 2949431 | A1 | 12/2015 | |
| EP | 3005495 | A1 | 4/2016 | |
| EP | 3053708 | A1 | 8/2016 | |
| EP | 2803449 | B1 | 4/2017 | |
| EP | 3153280 | A1 | 4/2017 | |
| EP | 3168005 | A1 | 5/2017 | |
| EP | 3178613 | A1 | 6/2017 | |
| EP | 2822715 | B1 | 12/2017 | |
| EP | 2732956 | B1 | 9/2018 | |
| EP | 3418000 | A1 | 12/2018 | |
| EP | 3587034 | B1 | 1/2020 | |
| EP | 3616847 | A1 | 3/2020 | |
| EP | 3651714 | A1 | 5/2020 | |
| EP | 3539725 | B1 | 2/2021 | |
| EP | 3939727 | B1 | 11/2022 | |
| GB | 2375981 | A | 12/2002 | |
| WO | 2011104105 | A1 | 9/2011 | |
| WO | 2013057180 | A1 | 4/2013 | |
| WO | 2017001423 | A1 | 1/2017 | |
| WO | 2018/114592 | A1 | 6/2018 | |
| WO | 2019/115302 | A1 | 6/2019 | |
| WO | 2019/115305 | A1 | 6/2019 | |
| WO | 2020/221722 | A1 | 11/2020 | |
| WO | 2020/229363 | A1 | 11/2020 | |

* cited by examiner

MULTI-HEADED POWER TOOL AND FASTENING SYSTEM FOR SAME AND SYSTEMS FOR FASTENING HEADS THEREON

CROSS REFERENCE TO RELATED APPLICATION(S)

This application claims priority to U.S. Provisional Patent Application Ser. No. 63/645,706, filed May 10, 2024 and U.S. Provisional Patent Application Ser. No. 63/604,689, filed Nov. 30, 2023, all contents of each of which are hereby incorporated by reference in their entirety.

BACKGROUND

Field

This disclosure relates, in general, to the field of power tools. In particular, the present disclosure is related to improvements for attaching multiple heads to a base power tool.

Description of Related Art

Power tools with removable chucks and/or tool heads are generally known. However, the devices used to connect the chucks/tool heads tend to require multiple steps for a user to assemble each tool head therein. For example, alignment, rotation, and adjustment—are typically required for applying the chucks and/or tool heads to known tools. Further, while ball bearings and compression springs are examples of known mechanical devices attachment of tool heads, such devices sometimes fail to be user friendly.

Connections and ease of use may be improved.

SUMMARY

It is an aspect of this disclosure to provide a power tool that includes: a housing; a motor and transmission assembly received in the housing; a trigger for activating the motor and transmission assembly; an output shaft driven by the motor and transmission assembly via a back end thereof for rotation about an axis; a head interface coupled to a forward end of the output shaft, the head interface comprising a mating surface and a circumferential groove; and a tool head element configured for selective engagement on the head interface. The tool head element has: a housing including an input shaft configured to removably couple with the output shaft; and a collar comprising a plurality of locking elements. Each locking element is biased inwardly towards the input shaft by biasing elements. Upon attachment of the tool head element to the head interface, the plurality of locking elements are aligned into the circumferential groove of the head interface and held by the biasing elements therein to engage the tool head element onto the head interface and establish a drive connection between the output shaft and input shaft such that, when the motor and transmission assembly of the power tool is operated, the input shaft is configured to rotate with the output shaft about the axis and thus drive the tool head element.

Another aspect provides a method of using the power tool noted above.

Other aspects, features, and advantages of the present disclosure will become apparent from the following detailed description, the accompanying drawings, and the appended claims.

BRIEF DESCRIPTION OF THE DRAWINGS

The drawings described herein are for illustrative purposes only of selected embodiments and not all possible implementations, and are not intended to limit the scope of the present disclosure.

DETAILED DESCRIPTION OF THE PREFERRED EMBODIMENT(S)

As evident by the drawings and below description, this disclosure relates to a quick and secure way of attaching multiple tool heads (or chucks) to a base power tool or main body. As will be described, the disclosed tool heads are designed such that no action is needed from the user for assembling tool head(s) other than pushing the tool head onto the base unit. To remove or change the tool head, a collar is pulled and the tool head is removed. The disclosed embodiments provide examples of structures that radially and axially constrain variable application heads onto the main body or base of a multi-use power tool, independent of torque transfer.

These and other features and advantageous effects are evident by the details below.

Figure 1:
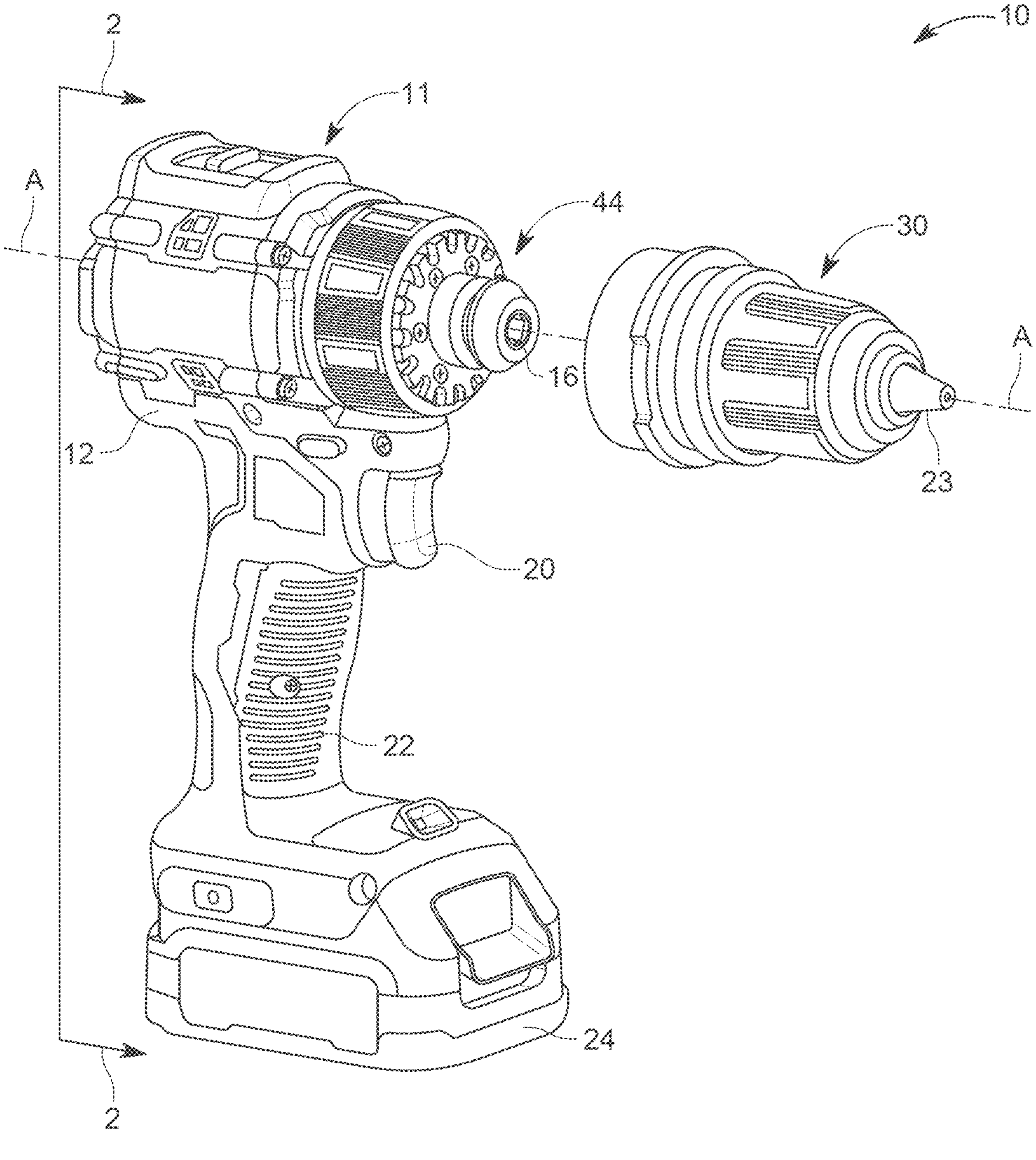
FIG. 1 shows an exploded view from a front angle of a power tool with a tool head assembly in accordance with an embodiment of the disclosure.
Figure 2:
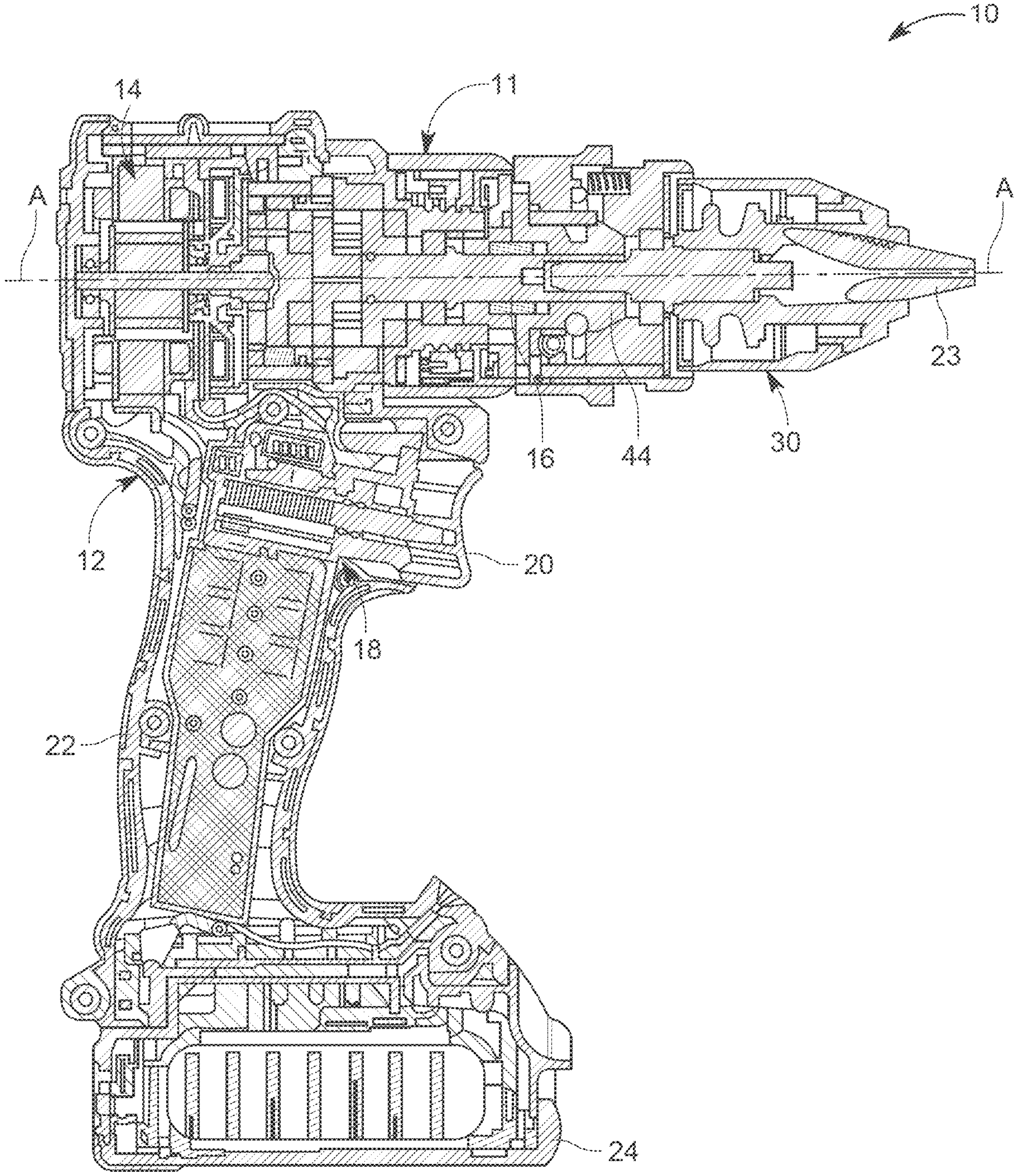
FIG. 2 shows a cross-sectional view through line 2-2 of the power tool of FIG. 1 upon assembly, in accordance with an embodiment.
Figure 3:
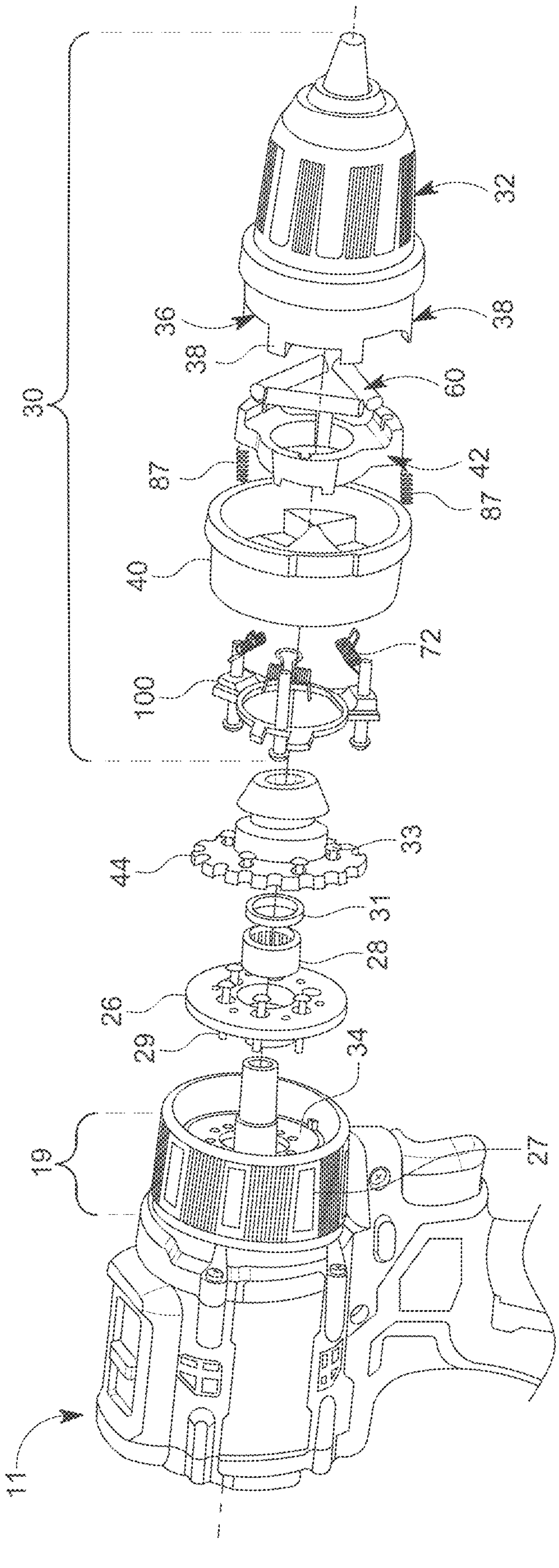
FIG. 3 shows an exploded view from a front angle of parts of the power tool and a tool head assembly in accordance with an embodiment.

With reference to FIGS. 1-3 of the drawings, a power tool 10 is constructed in accordance with the teachings of the present disclosure. As those skilled in the art will appreciate, the power tool 10 may be either a corded (e.g., AC powered) or cordless (e.g., DC battery operated) device. In an embodiment, the power tool 10 is a portable device. In embodiments, the power tool 10 may be a drill, a screwdriver, impact driver, driver or hammer drill, or other power tool, as determined by the attached end effector, or tool head element 30. As will be described, the tool 10 includes a main body portion 11 that is configured to receive multiple types of tool heads, chucks, or end effectors, each generally referred to herein and throughout this disclosure as a "tool head element," 30, which is described in greater detail later. Examples of such tool head elements include, but are not limited to, a standard chuck, a hammer chuck, a right angle tool head, offset and quick release bit holder designs, which are designed to attach to a base unit or housing, for example. The tool head elements 30 may include a number of drill elements, for example. However, such examples of the type of tool head elements and tool attachments as described and/or shown in the illustrative embodiments of the Figures are not intended to be limiting. That is, the tool attachments shown in the Figures relate to rotary fastening, but are not limited to rotary fastening. Those skilled in the art understand that other types of features (besides fastening or drilling) may be utilized as part of a tool head element 30 that is attached to a base or main body 11 of a power tool 10. Each tool head element 30 includes a fastening system as described herein which includes a tool part housing 32 and a collar 40 (described in detail later).

Figure 44:
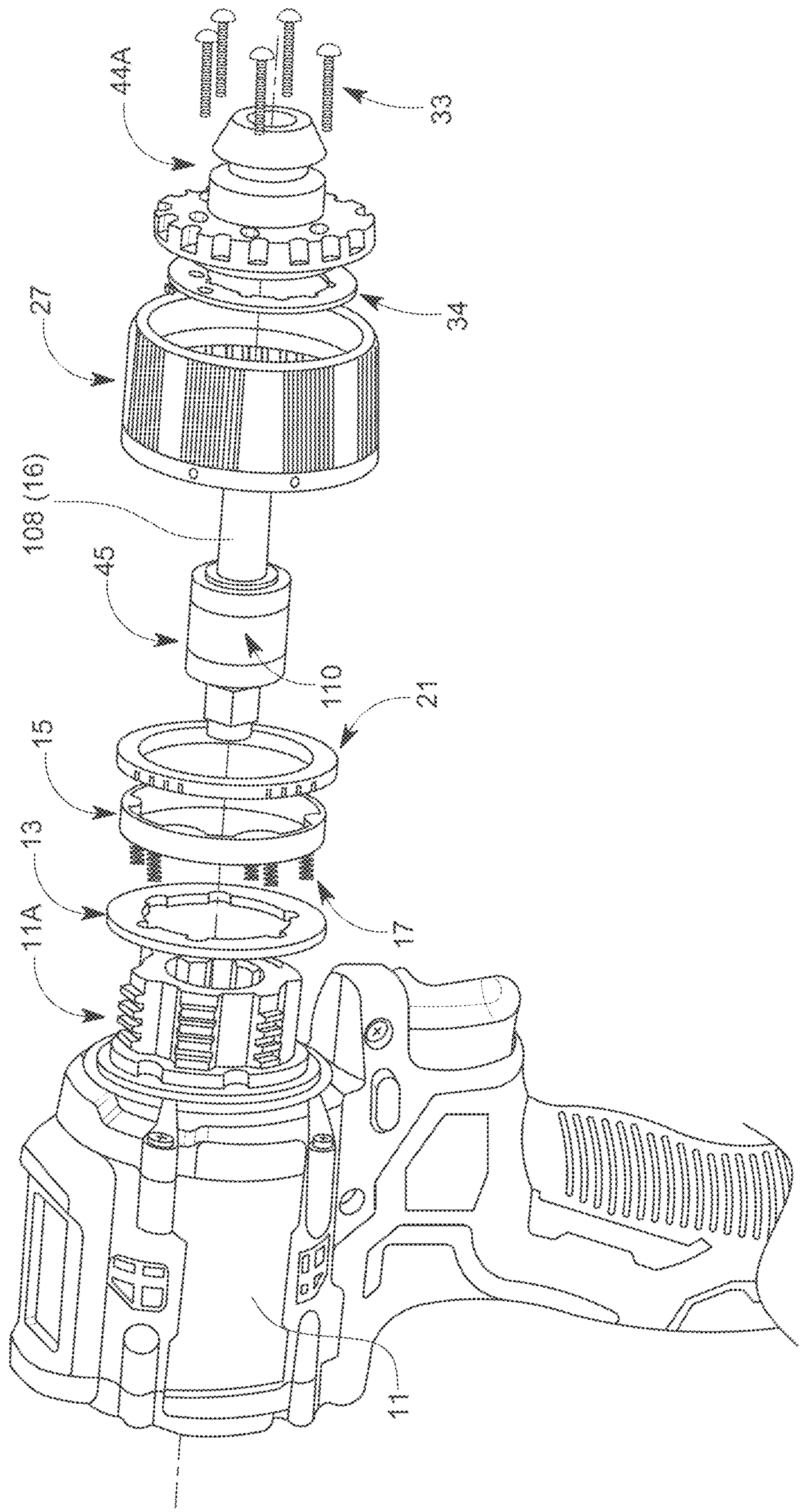
FIG. 44 shows an exploded view from a front angle of parts of the power tool and a tool head assembly with the spindle and bearings of FIG. 38 in accordance with another embodiment.
Figure 47:
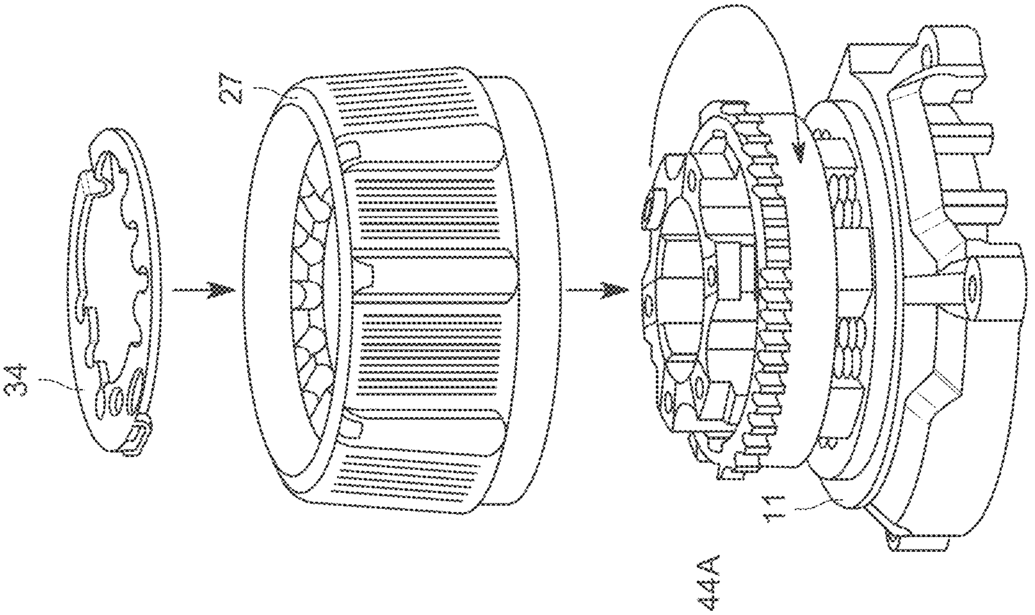

An exemplary power tool 10 is shown in FIGS. 1-2. In this non-limiting, illustrative embodiment, the power tool 10 has a main body portion 11 having a housing 12, a motor and transmission assembly 14, an output shaft 16 (or output spindle), a trigger assembly 18 with trigger button 20 on a handle 22, a clutch housing mechanism or arrangement 19, and a removable battery pack 24. The clutch housing arrangement 19 includes common or known parts as understood by those skilled in the art, such as shown and described with reference to FIG. 44. FIG. 44 shows an exploded view of the clutch housing arrangement 19, spindle and bearings arrangement 45, universal head interface 44 or 44A, and additional parts, according to an embodiment. For example, the clutch housing arrangement 19 may include a clutch washer 13, clutch spring holder 15, clutch springs 17, and a clutch nut 21 that are enclosed or surrounded by a clutch collar 27 on an extended clutch housing portion 11A of main body portion 11. Also shown in FIG. 44 is a detent plate 34, which is commonly used in clutch housing arrangement 19. The detent plate 34 is connected to the clutch collar 27 (see FIG. 3) and of the clutch housing arrangement 19 on the main body portion 11. Generally, in embodiments, the detent plate 34 includes a frame surrounding a central opening to accommodate insertion of parts therethrough. The detent plate 34 provides positions and feedback to a user when moving the clutch collar between different settings. The clutch housing arrangement 19 is assembled with the detent plate 34 attached to a front surface thereof, as shown in FIG. 47. Other devices, such as a spindle lock and the like are also known and not necessarily described. Those skilled in the art will understand that several of the components of main body portion 11 of power tool 10, such as the motor and transmission assembly 14, the trigger assembly 18 and the battery pack 24, are conventional in nature and need not be described in significant detail in this application.

The housing 12 may include a pair of clam shells or mating shells in the form of halves that cooperate to define a body, the handle 22 and a battery interface that may be configured to receive the battery pack 24. The handle 22 is configured to be coupled to the power source. In embodiments, the power source includes the battery pack 24, or, as previously mentioned, an AC power connection to receive power from an AC power source (not shown).

The trigger assembly 18 and the battery pack 24 are mechanically coupled to the handle 22 and are electrically coupled to the motor and transmission assembly 14 in a conventional manner that is not specifically shown but which is readily understood by and within the capabilities of a person of ordinary skill in the art. The trigger is designed for selectively activating the motor and transmission assembly 14, and thus use of an attached tool head element 30. In one embodiment, the power tool 10 includes other sources of power (e.g., alternating current (AC) power cord/cable, compressed air source and/or other sources of power)

coupled to a distal end of the handle 22 (i.e., in place of the battery interface that receives the battery pack 24). In one embodiment, the trigger assembly 18 is a variable speed trigger. The trigger assembly 18 may be configured to be operatively coupled to the housing 12 for selectively actuating and controlling the speed of the motor, for example, by controlling a pulse width modulation (PWM) signal delivered to the motor. The handle 22 may be configured to house the trigger assembly 18 in a conventional manner, while the body can define a motor cavity into which the motor and transmission assembly 14 may be received. The housing 12 may be configured with an exterior gear case housing (not shown) that can be coupled to a front side of the body and configured to shroud or cover all or portions of the transmission assembly 14 and a clutch mechanism. In the particular example shown, however, the clam shell housing halves are configured to shroud or cover the motor and transmission assembly 14 and the clutch mechanism.

The motor and transmission assembly 14 may include a motor and an optional adapter plate. The motor of the motor and transmission assembly 14 is disposed/received in the housing 12 (such as seen in FIG. 2). The motor may be housed in a motor receiving portion or motor cavity of a drive train or a body portion of the housing 12. The motor may include a output motor shaft rotatable about an axis A-A, which extends into the transmission receiving portion of the drive train of the housing 12. The motor may be electrically coupled to the trigger assembly 18 and the battery pack 24, such that selectively provide electric power to the motor and transmission assembly 14 in a manner that is generally well known in the art, so as to permit the user of the power tool 10 to control the speed and direction with which the rotatable output motor shaft rotates. The adapter plate may be fixedly coupled to an end of the motor. A motor pinion having a plurality of gear teeth may be coupled for rotation with the rotatable output motor shaft. The motor may be any type of motor, such as a brushless or electronically commutated motor, a DC electric motor, or a universal motor. As described herein and understood by those having skill in the art, the motor shaft is configured to transmit torque from the motor output shaft to an output member (e.g., an output shaft or output spindle) which in turn provides torque to an end effector or tool head element 30 (e.g., via a clutch assembly).

The transmission of the assembly 14 may comprise a transmission housing and a transmission. The transmission housing may be a hollow, generally tubular structure that is configured to house the transmission and portions of the clutch mechanism. The transmission housing may be received into the motor cavity and may engage the clam shell housing halves such that the transmission housing is axially fixed and non-rotatably engaged to the housing 12. In embodiments, the transmission may be a single speed transmission. In other embodiments, the transmission may include a multi-speed transmission having a number of gears and settings that allow the speed reduction through the transmission to be changed, in a manner well understood to a person of ordinary skill in the art. In embodiments, the transmission may be a planetary-type transmission having an input planetary stage and an output planetary stage that may be received in a central cavity of the transmission housing. It will be appreciated, however, that the power tool 10 is not limited to using a two-stage, single speed transmission; rather, the teachings of the present disclosure have application to other types of transmissions, including those that are operable in more than one speed ratio and/or those that comprise fewer or more than two planetary stages (i.e., a single stage planetary transmission or a transmission having at least one planetary stage disposed between the input and output planetary stages).

The power tool 10 may also include an output member 16 in the form of an output shaft or output spindle (see, e.g., 108) that is at least partially received in and rotatable (via activation of trigger button 20 and motor and transmission assembly 14) about axis A-A relative to the housing 12. The output member may be interchangeably referred to herein as output shaft 16.

Generally, the tool head element 30 of the power tool 10 is mounted to the output spindle 16 of the power tool 10. The tool head element 30 is operatively coupled to the housing 12 and is configured to perform an operation on a workpiece (not shown) via its associated work device. The associated work device of the tool head element 30 may be configured as a power tool accessory, such as a drill bit, an expansion bit, a screw driver bit, and/or other tool bits, according to non-limiting embodiments. The tool head element 30 may include a tool bit holder portion 23, such as chuck jaws, therein. In one embodiment, the tool head element 30 may be a keyless chuck, although it should be understood that the tool holder can have other tool holder configurations such as a quick release tool holder, a hex tool holder, or a keyed tool holder/chuck. The tool bit holder portion 23 may include an opening for receipt of a tool, such as a drill bit, or be a tool itself. As generally understood by those skilled in the art and thus not described in detail here, the tool head element 30 may be configured such that a portion thereof (e.g., tool part housing 32) is rotated to adjust a width of the opening of the tool bit holder portion 23 to receive and lock an associated tool therein, so that power and operation via trigger is applied to the tool head element 30 and its tool(s).

Figure 4:
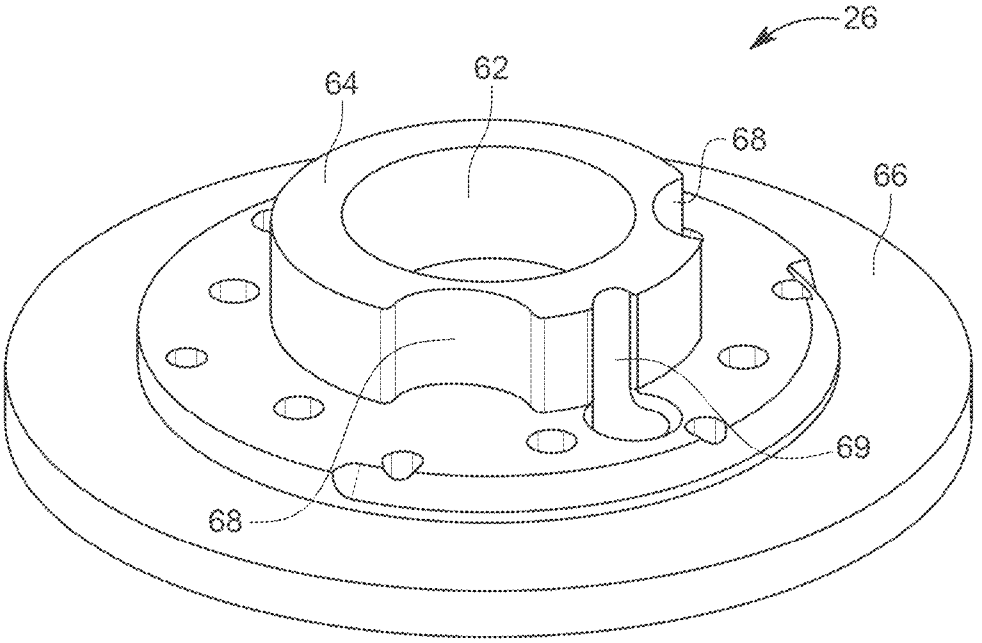
FIGS. 4-5 show a first isometric view and a second isometric view, respectively, of an adapter plate used in the power tool of FIG. 1 in accordance with an embodiment.
Figure 5:
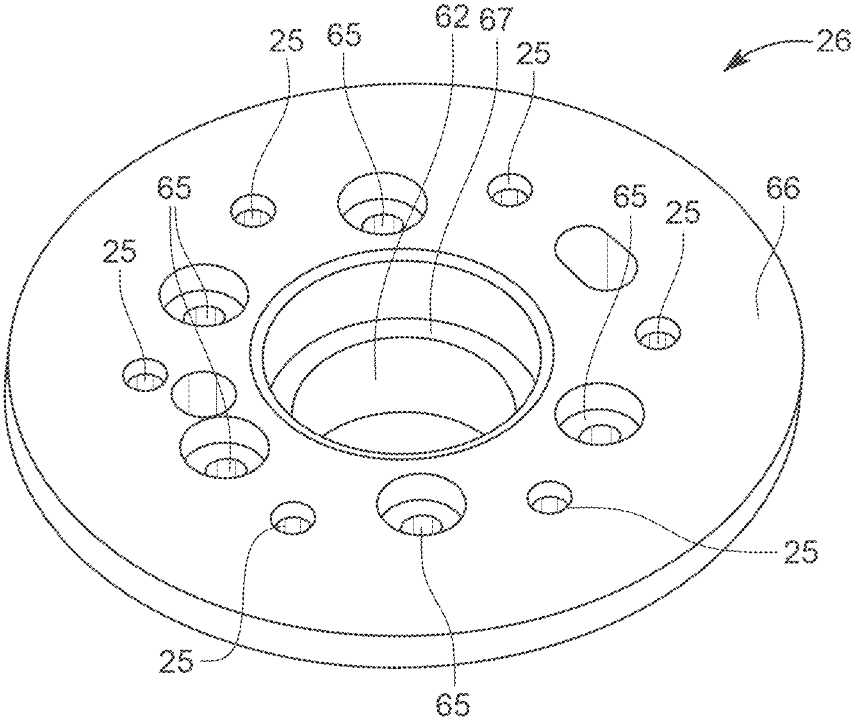

More specifically, each tool head element 30 is configured for attachment to the output shaft 16 via a universal head interface 44 or 44A that is, according to some embodiments, coupled to an adapter plate 26 on the main body portion 11. As shown in FIGS. 4-5, in embodiments, the adapter plate 26 includes a central opening 62 therein to accommodate a second end of the output shaft 16 therethrough. The first isometric view of FIG. 4 shows a back surface of the adapter plate 26, i.e., the surface that is placed against interface of the main body portion 11 for attachment thereto. The second isometric view of FIG. 5 shows a front surface of the adapter plate 26, i.e., a surface that is front or forward facing from the main body portion 11. According to embodiments herein, the adapter plate 26 includes a projection 64 surrounding the opening 62 which extends from a connection plate 66 or flange. An outer diameter of the connection plate 66 or flange may be based on a diameter or dimensions of an interface on the main body portion 11 to which the adapter plate 26 is connected (see, e.g., FIG. 3), in accordance with some embodiments herein. The projection 64 may have an outer diameter that is configured to interface with a clutch housing/mechanism. An inner diameter of the central opening 62 may be dimensioned or sized based on dimensions (e.g., diameter) of the output shaft 16; that is, the central opening 62 may be sized to allow rotation and clearance of the output shaft 16 therein. Further, relief portions 68 and 69 are provided in the projection 64 to provide clearance for a washer and clutch housing tab of the main body portion 11; that is, as one non-limiting example, such cutouts may be provided for clearance to a washer providing a detent function on the clutch. The relief portions 68, 69 may be concave such that they extend into an outer diameter of the projection 64, as shown in FIG. 4. The adapter plate 26 is connected to a front face or interface of the main body portion 11 via fasteners 29 or screws being placed through holes 65 (see FIG. 3 and FIG. 5) in the flange/connection plate 66 and secured to main body portion 11. Additional holes 25 are provided in the connection plate 66 for connection to the head interface 44, as described later below. As shown in FIG. 5, in embodiments, the back side of the projection 64 includes a detent 67 for accommodating a bearing (e.g., needle bearing 28 as shown in FIG. 3, or similar roller bearing) of the tool. The detent 67 may be sized or dimensioned to allow receipt of an outer diameter of the bearing and at least part (a first part) of a length of the bearing 28 therein. For assembly, then, the back surface of the adapter plate 26, i.e., the projection 64, is positioned to face the interface of the main body portion 11. The central opening 62 of the adapter plate 26 is aligned with the second end of the output shaft 16 and the shaft 16 pushed therethrough, such that the projection 64 is received within the clutch housing. Fasteners 29 or screws are used to secure the adapter plate 26. The front surface of the adapter plate 26 is then accessible such that bearing 28 may then be placed in the detent 67 and around the extending output shaft 16.

Figure 6:
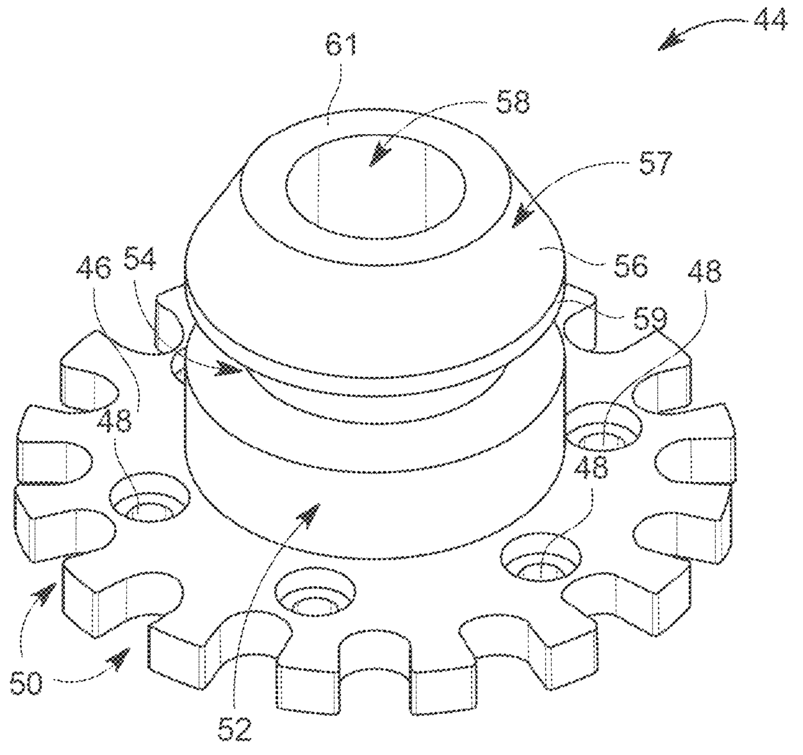
FIGS. 6, 7, and 8 show a first isometric view, a second isometric view, and a cross sectional view of a head interface used in the power tool in accordance with an embodiment.
Figure 7:
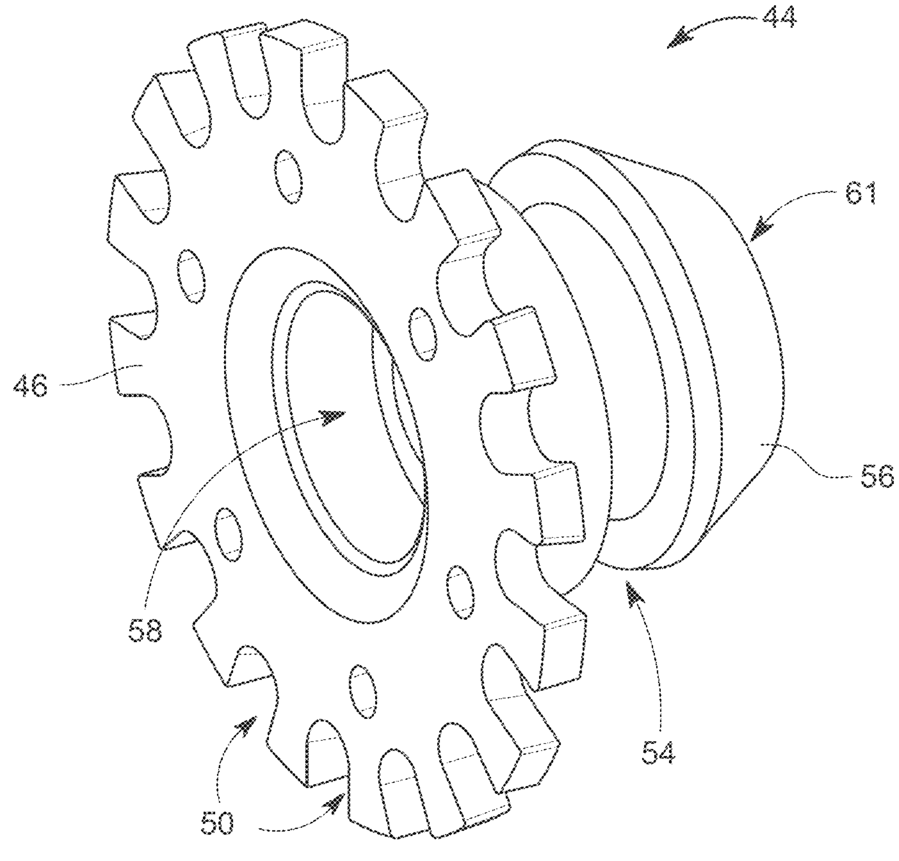
Figure 8:
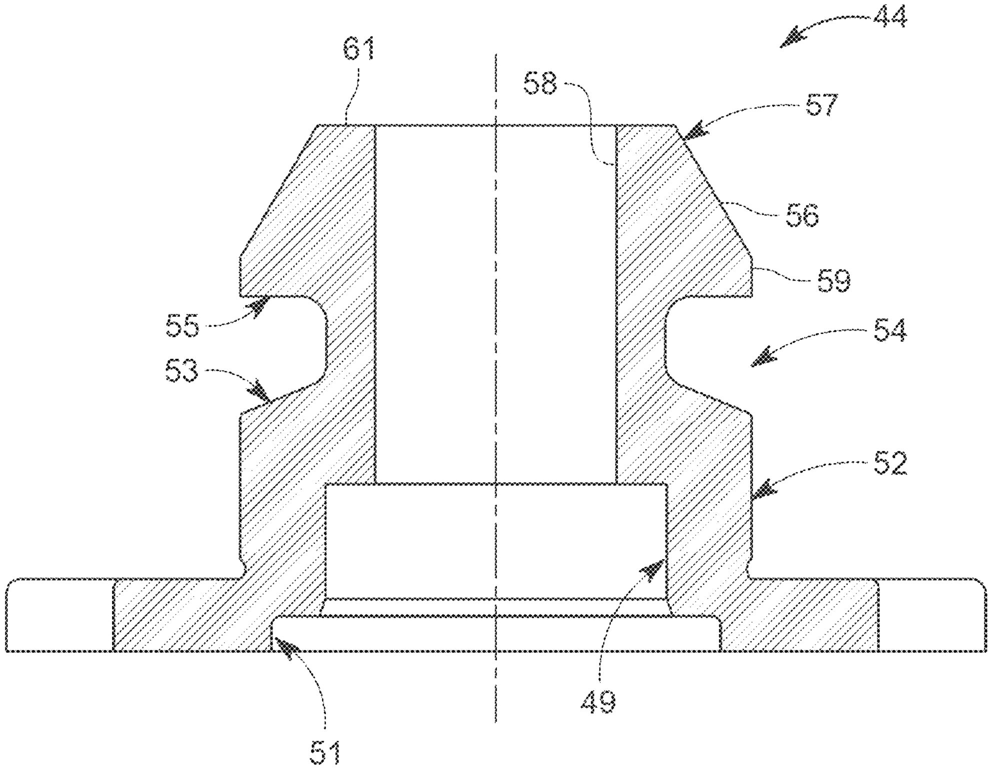

As noted, the adapter plate 26 may be used in some embodiments for connecting a universal head interface 44, such as shown in FIGS. 6-8, thereto. In the embodiment shown in FIGS. 6-8, the universal head interface 44 is designed to be placed around a portion of the output shaft 16 and connected to the adapter plate 26, with the bearing 28 and a seal 31 (see FIG. 3) therebetween.

Figure 38:
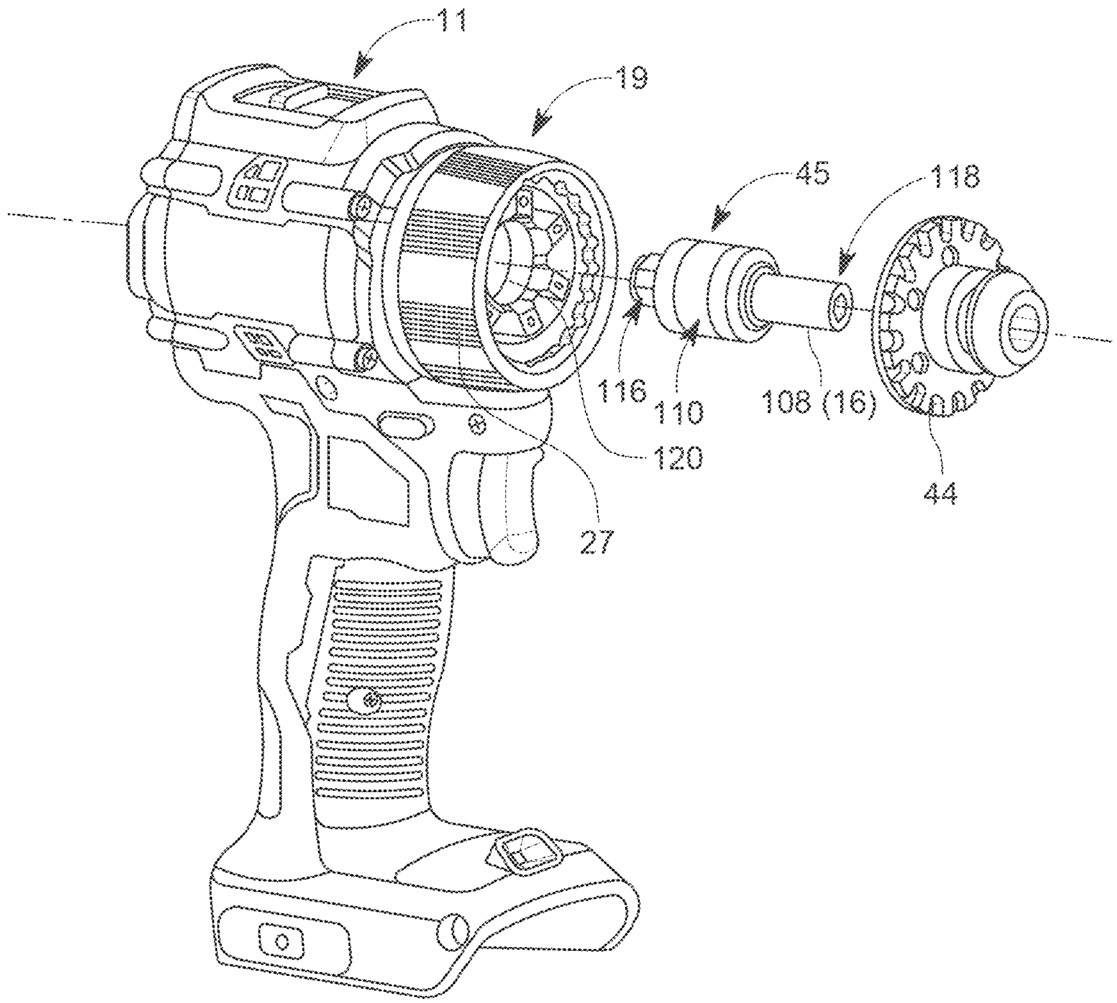
FIG. 38 shows a first isometric view of a spindle and bearings used in the power tool of FIG. 1 in accordance with an embodiment.
Figure 45:
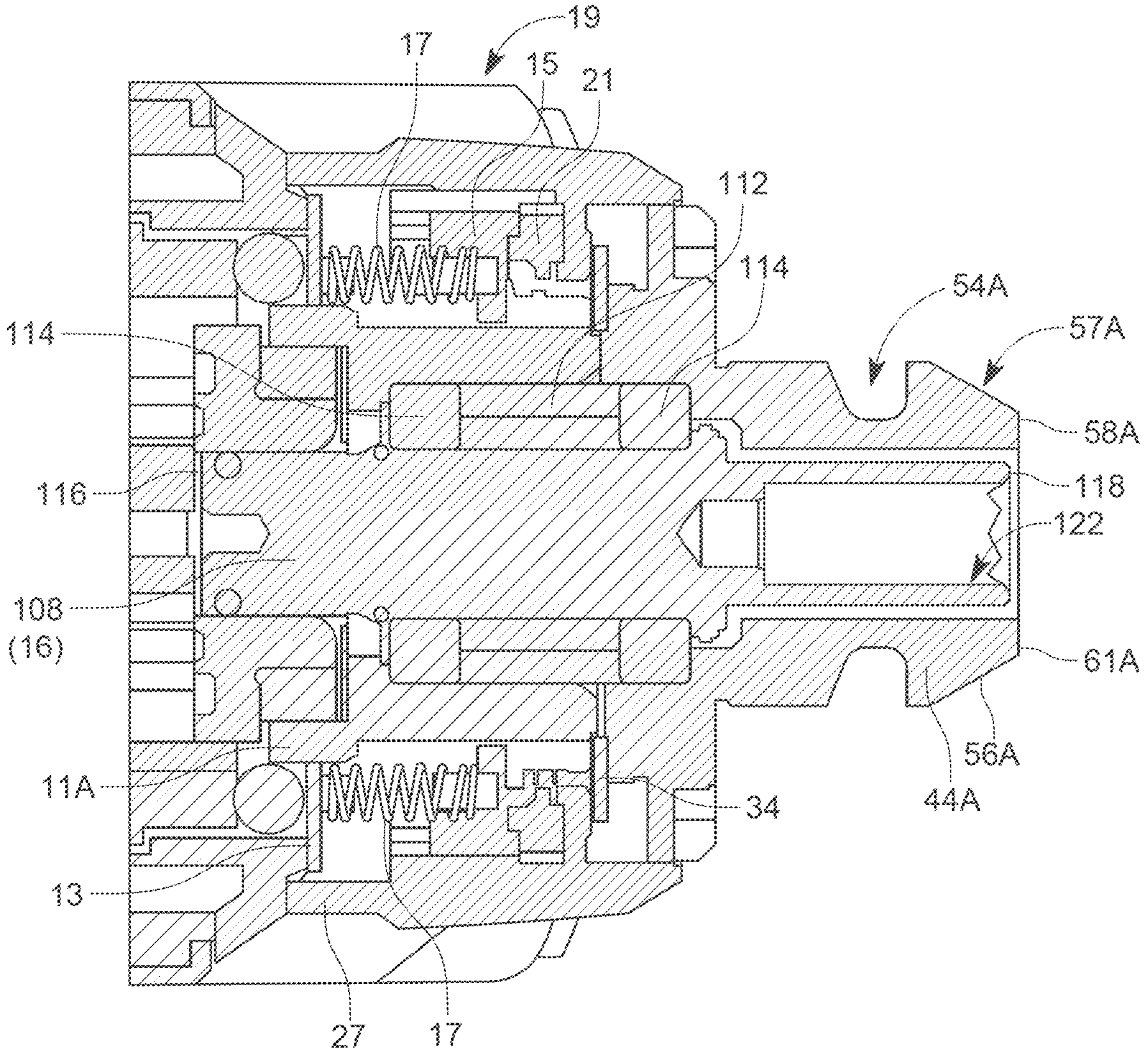
FIG. 45 shows a cross sectional view, in an axial direction, of an assembly of the parts of FIG. 38.

Alternatively, in another embodiment, a universal head interface 44A may be configured to attach to the main body portion 11 via a combination spindle and bearings arrangement, labeled as 45 as shown in FIGS. 38 and 44, for example. The output shaft 16 may be connected to the spindle and bearings arrangement 45, which is designed for insertion into an opening 120 (see FIG. 38) of the main body portion 11. That is, a first end of the output shaft 16 may be connected to the main body portion 11, while a second end of the output shaft 16 is used for attachment to/with the arrangement 45 and thus the universal head interface 44A (see FIG. 44). An outer diameter of the output shaft 16 and/or the portion (e.g., front end) of the spindle and bearings arrangement 45 may be based on a diameter or dimensions of an interface on the main body portion 11 and/or the universal head interface 44, in accordance with embodiments. FIG. 45 shows a cross sectional view, in an axial direction, of the universal head interface 44 secured and assembled to the main body portion 11 via the clutch housing arrangement 19.

The spindle and bearings arrangement 45 allows for tool head element(s) to be more directly tied to a spindle, output shaft 16, etc. for rotation and/or operation of its associate tool, using less parts and less dimensions (e.g., reduced stackup) by removing elements therefrom, while still maintaining the connection for operating.

In accordance with embodiments, the spindle and bearing arrangement 45 may include a spindle body 108 (i.e., the output member 16 that is at least partially received in and rotatable (via activation of trigger button 20 and motor and transmission assembly 14) about axis A-A relative to the housing 12, according to this particular embodiment) with a first end 116 and a second end 118, and a central opening therein that is sized to allow for clearance and insertion of the output shaft 16 placed therein. The first end 116 may be referred to as a back end, whereas the second end 118 may be referred to as a front end according to embodiments. The output shaft 16/spindle body 108 may be pushed through the central opening of a bearing set 110, for example, for rotation of the spindle body 108 along the axis. The bearing set 110 may be placed around the spindle body 108 as part of the arrangement 45. In an embodiment, the bearing set 110 is provided generally in a center of the spindle body 108, with ends 116 and 118 accessible on either side. As shown in FIG. 45, for example, in embodiments, the bearing set 110 includes one or more bearing spacers 112 flanked by spindle bearings 114 on either side. As noted previously, first end 116 of the arrangement 45 may be placed into the main body portion 11, through opening 120, such that the second end 118 is accessible via a front end of the tool 10. The second end 118 may include a receiving opening 122 therein, which is shown in FIG. 45, for example. The receiving opening 122 of spindle body 108 is accessible through a central bore 58A of the universal head interface 44A (see FIG. 39 and FIG. 41, and description below) when assembled, and is configured to receive an input shaft 70 of a tool head element 30 when the tool head element 30 is attached to the head interface 44A (which is described in detail later below with reference to FIGS. 9-10A). FIG. 44 shows an exemplary illustrated embodiment with the universal head interface 44A that designed for connection to clutch collar 27 (provided on main body portion 11) with detent plate 34 therebetween, with the universal head interface 44A configured to receive spindle and bearing arrangement 45 therein.

Figure 48:
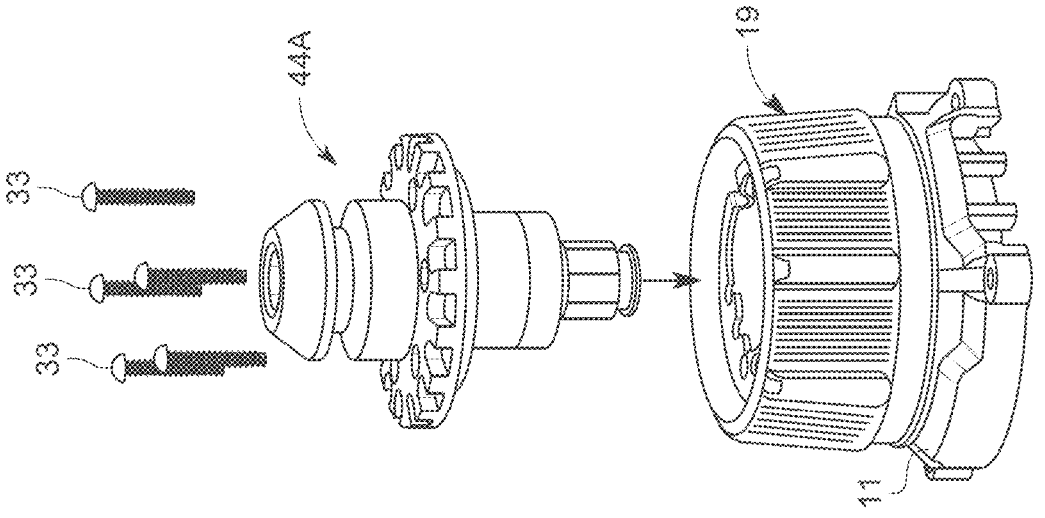
FIGS. 46-48 show a process of assembling and mounting the universal head interface to the tool using the spindle and bearings of FIGS. 38-40 in accordance with an embodiment.
Figure 46:
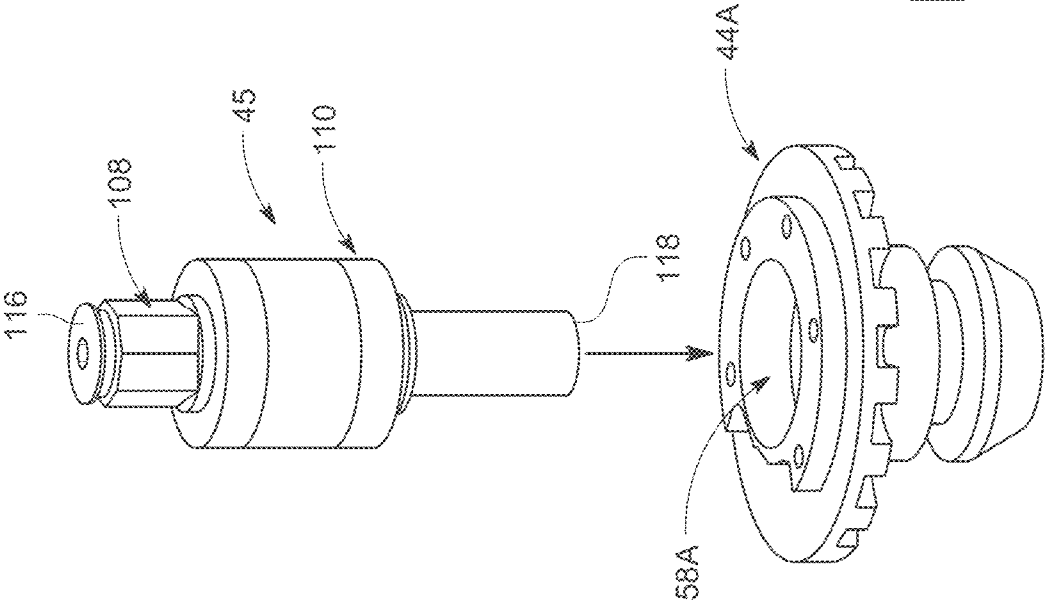

FIGS. 46-48 show a process of assembling and mounting the universal head interface 44A using the spindle and bearings arrangement 45 of FIGS. 38-45, in accordance with an embodiment. Generally, the spindle and bearings arrangement 45 is inserted into and at least partially through central bore 58A via a back of the universal head interface 44A, as shown in FIG. 46. The clutch housing arrangement 19 is assembled with the detent plate 34 attached to a front surface thereof, as known in the art and as shown in FIG. 47. The universal head interface 44 is coupled to the main body portion 11 via the spindle and bearings arrangement 45, wherein first end 116 of the spindle and bearings arrangement 45 is inserted and secured in the opening 120 for rotational attachment at the forward/first end of the output shaft 16/spindle body 108, as shown in FIG. 48. Second end 118 of the spindle and bearings arrangement 45 is configured for insertion into, and shown inserted through, the universal head interface 44A, such that opening 122 (for connecting parts of the tool head element 30) is accessible within the head interface 44A (described below).

The universal head interface 44 or 44A is designed to be placed around the output shaft 16, whether using the adapter plate 26 (and its related parts), or the spindle and bearings arrangement 45 (and its related parts) (i.e., the spindle body 108 being the output shaft 16).

In the embodiment utilizing adapter plate 26 (e.g., FIG. 3), the universal head interface 44 shown in FIGS. 6-8 may be implemented in the power tool 10. The first isometric view of FIG. 6 shows a front facing portion of the head interface 44, i.e., the portion that is used to connect and interact with the tool head element 30. The second isometric view of FIG. 7 shows a back surface (of flange 46) of the head interface 44. The back surface of the head interface 44 is a surface that is placed against the adapter plate 26 and used to connect the head interface 44 to the plate 26 and thus the clutch housing arrangement 19 and main body portion 11.

The cross-sectional view of FIG. 8 shows additional features of the head interface 44 in accordance with an embodiment.

The universal head interface 44 has a first end and a second end, with the central bore 58 extending therebetween. The first end has a flange 46 extending radially relative to the central bore 58 that is used for attachment to the main body portion 11, and the second end has a leading flat edge 61. An outer diameter of the flange 46 may be based on the outer diameter or dimensions of the adapter plate 26, in accordance with embodiments. In other embodiments, an outer diameter of the flange 46 may be based on the inner diameter or dimensions of the clutch housing arrangement 19/main body portion 11. The flange 46 has holes 48 for fasteners 33 (e.g., screws) which are aligned with corresponding holes 25 provided on the adapter plate 26 or provided on/through the detent plate 34 and into the main body portion 11. Flange 46 may be placed against the adapter plate 26 and the head interface 44 may be attached to the main body portion 11 via interface fasteners 33 or screws placed through the aligned holes 48 and 25 (see FIG. 3). Any number of fasteners or holes may be utilized for attachment of the universal head interface 44 and the number shown in the Figures is not intended to be limiting. As shown in FIGS. 6-7, flange 46 may include a number of receiving grooves 50 along a circumference or periphery thereof in accordance with embodiments herein. In another embodiment, the receiving grooves 50 may be provided on a front surface of the flange 46. Such receiving grooves 50 may be dimensioned and configured to receive corresponding teeth 78 or castellations of the collar 40 (described later). The leading edge 61 at the second end of the head interface 44 may be a flat surface extending radially from the bore 58.

To attach the universal head interface 44 to the main body portion 11, the central bore 58 or opening thereof is aligned with the output shaft 16 effectively extending through the adapter plate 26 and/or detent plate 34. That is, the second end of the output shaft 16 is inserted through an opening of the central bore 58 in the back surface of the head interface 44 (i.e., the opening on a back side of the flange 46, shown in FIG. 7).

The central bore 58 is configured to receive at least a portion of the output shaft 16 therein (see, e.g., FIGS. 1-2), according to embodiments, such that the shaft 16 extends towards the first end of the head interface 44 and at least a portion of the second end of the output shaft 16 is accessible through leading edge 61 and the bore 58. An inner diameter of the central bore 58 may be dimensioned or sized based on dimensions (e.g., diameter) of the output shaft 16 in an embodiment; that is, the central bore 58 may be sized to allow rotation and clearance of the output shaft 16 therein.

Further, as shown in FIG. 8, in embodiments, the central bore 58 may include notches 49 and 51. Notch 49 (or bore 49) is provided for accommodating seal 31 and bearing 28. Notch 51 (or bore 51) may be provided to engage a ball bearing for particular tool head element(s) 30, such as a right angle attachment. In embodiments, the notches 49 and 51 include stepped diameters that may gradually increase in size as compared to the diameter of the central bore 58. The size or dimension of the notch 49 may correspond to and accommodate a size of the seal 31. The notch 51 may be sized or dimensioned to allow receipt of an outer diameter of the bearing and at least a second part of a length (or remaining length) of the bearing 28 (e.g., that extends from or is not received in the adapter plate 26).

Between the flange 46 and leading edge 61 and surrounding central bore 58 of the head interface 44 are a number of interface surfaces for connection with tool head element 30, according to an exemplary embodiment. In embodiments, as shown FIG. 8, there may be a first interface portion 52 and a second interface portion 57, with a circumferential groove 54 therebetween, surrounding the bore 58. First interface portion 52 may extend axially from the flange 46 and towards the leading edge 61. First interface portion 52 may include an outer surface having an outer diameter, in accordance with embodiments herein. Second interface portion 57 acts as a piloting surface and may include, in accordance with embodiments herein, a mating surface 56 and an interfacing edge 59 that has an outer diameter. The outer diameter surface of first interface portion 52 and the interface edge 59 of the second interface portion 57 are configured to interfaces with a spring holder frame 42 (described with reference to FIGS. 16-17) and locking elements 60 when the tool head element 30 is attached to the main body portion 11. In embodiments, the outer diameters of the outer surface of first interface portion 52 and the edge 59 of the second interface portion 57 may be substantially equal or the same. In embodiments, the leading edge 61 has a smaller diameter than the interfacing edge 59.

The mating surface 56 of the head interface 44 assists in alignment and engagement of locking elements 60, which is understood by the description later below with reference to FIGS. 24-27, for example. Generally, during assembly, collar 40 remains relatively stationary. In embodiments, the mating surface 56 may include a chamfered surface that extends between leading edge 61 and the interfacing edge 59 and is positioned circumferentially around bore 58. More specifically, in one particular embodiment, the mating surface 56 is an angled surface that extends between a first diameter at the leading edge 61 and a second diameter at the interfacing edge 59. According to embodiments, the mating surface 56 is a tapered surface or cone shaped surface that tapers outwardly relative to the axis A-A. That is, the surface 56 tapers outwardly from the first diameter at the leading edge 61 of the front end to the second diameter of interfacing edge 59. In a non-limiting embodiment, the tapered surface is provided at an angle of about 30 degrees relative to the axis A-A.

However, the illustrated example of the mating surface 56 is not intended to be limiting in any way to a tapered surface. That is, in other embodiments, the mating surface 56 may include step or curve provided along the angled surface between the leading edge 61 and interfacing edge 59.

As shown in FIG. 8, for example, the circumferential groove 54 is provided axially behind the mating surface 56, or, as previously noted, between the first and second interface portions 52 and 57. The groove 54 is flanked by locking surfaces 53, 55 that are part of each interface portion 52, 57, respectively. Locking surfaces 53 and 55 are surfaces utilized for locking and securing locking elements 60 within the head interface 44, as discussed in greater detail later.

Turning now to the exemplary embodiment utilizing the spindle and bearings arrangement 45 (e.g., see FIG. 38 and FIG. 44) for connecting to the main body portion 11, universal head interface 44A may be provided in accordance with embodiments herein. An exemplary embodiment of universal head interface 44A is shown in FIGS. 38-41. For purposes of clarity and brevity, like elements and components throughout FIGS. 38-41 are labeled with similar designations and numbering (plus "A") as discussed with reference to FIGS. 6-8. Thus, although not discussed entirely in detail herein, one of ordinary skill in the art should understand that various features associated with FIGS. 6-8 are similar to those features previously discussed. Additionally, it should be understood that the features shown in each of the individual figures is not meant to be limited solely to the illustrated embodiments. That is, the features described throughout this disclosure may be interchanged and/or used with other embodiments than those they are shown and/or described with reference to.

Figure 39:
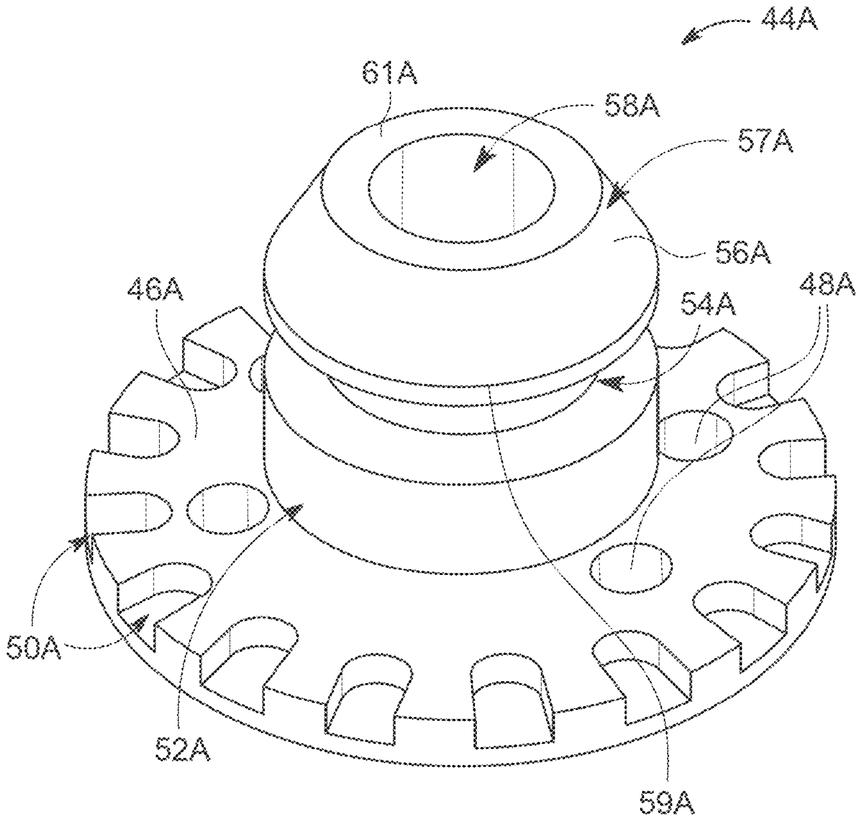
FIGS. 39, 40, and 41 show a first isometric view, a second isometric view, and a cross sectional view of a head interface used in the power tool in accordance with another embodiment.
Figure 40:
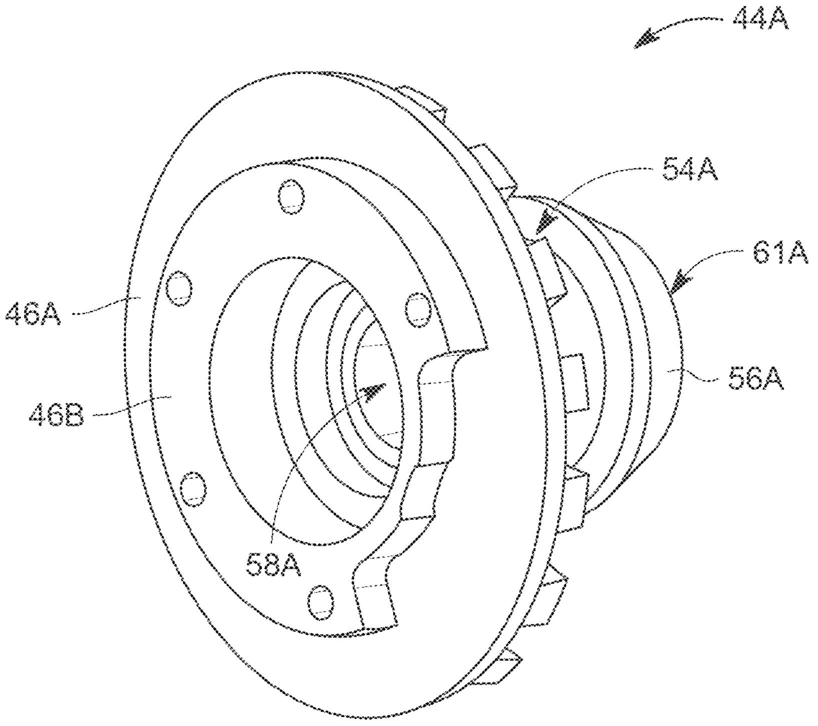
Figure 41:
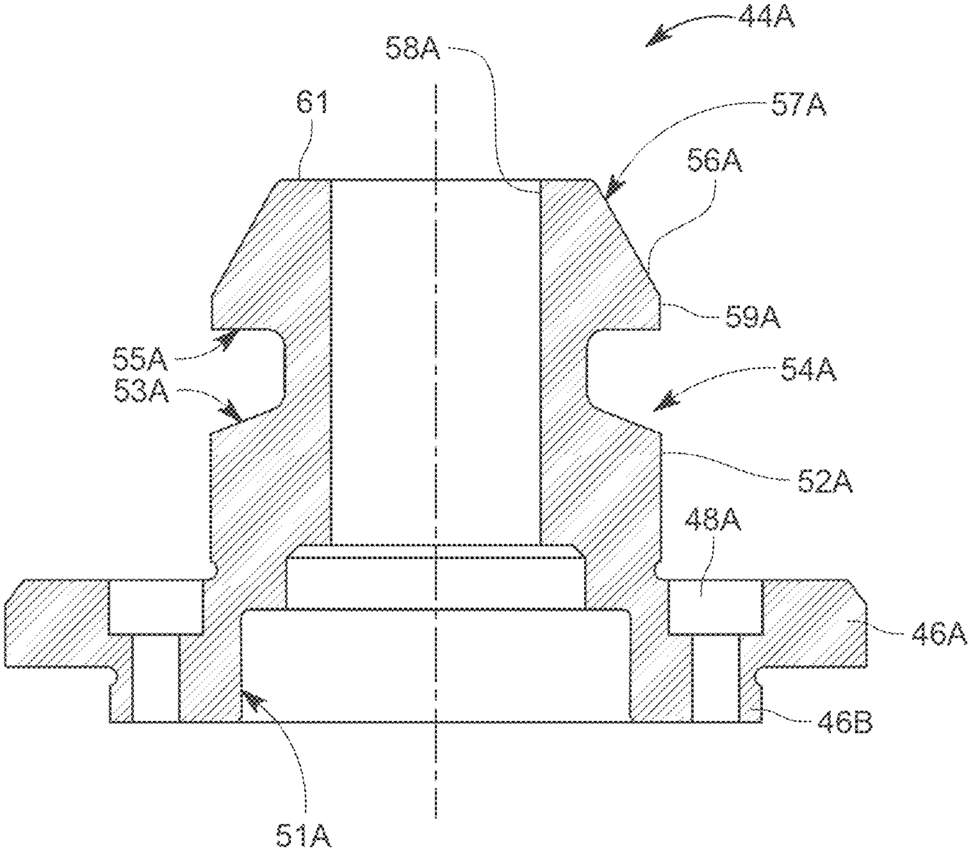

For the features shown and labeled in FIGS. 39-41, the first isometric view of universal head interface 44A in FIG. 39 shows a front facing portion thereof, i.e., the portion that is used to connect and interact with the tool head element 30. The second isometric view of FIG. 40 shows a back surface of the head interface 44A placed against the detent plate 34. The back surface (of flange 46A) of the head interface 44A is a surface that is placed against the detent plate 34 (see FIG. 45) and used to connect the head interface 44A to the clutch housing arrangement 19 and thus main body portion 11. As shown in FIG. 40 and FIG. 41, the back surface of flange 46A may include an alignment flange 46B. Alignment flange 46B is configured for aligning against the frame of the detent plate 34 and the clutch housing arrangement 19 as shown in FIG. 45. The second end 118 of the output shaft 16/spindle body 108 of the spindle and bearings arrangement 45 is inserted into the central bore 58A, thus providing securement of the output shaft 16 to the head interface 44A. The cross-sectional view of FIG. 41 shows additional features of the head interface 44A in accordance with an embodiment.

As previously described with reference to interface 44, the universal head interface 44A has a first end and a second end, with the central bore 58A extending therebetween. Also shown in FIGS. 39-41 are flange 46A, extending radially relative to the central bore 58A, that is used for attachment to the main body portion 11, and leading flat edge 61A (also referred to herein as a leading edge 61A), acting as a piloting surface. An outer diameter of the flange 46A may be based on the outer diameter or dimensions of the detent plate 34 and/or the inner diameter of the clutch housing arrangement 19, in accordance with embodiments. In other embodiments, an outer diameter of the flange 46A may be based on the inner diameter or dimensions of the clutch housing arrangement 19/main body portion 11. The flange 46A has holes 48A for fasteners 33 (e.g., screws) which are aligned with corresponding holes provided on/through the detent plate 34 and/or clutch housing arrangement 19, and into the main body portion 11. Flange 46A may be placed against the detent plate 34 and the head interface 44 may be attached to the main body portion 11 via interface fasteners 33 or screws placed through the aligned holes (see FIG. 39 and FIG. 48). Any number of fasteners or holes may be utilized for attachment of the universal head interface 44A and the number shown in the Figures is not intended to be limiting. As shown in FIG. 39, for example, flange 46A may include a number of receiving grooves 50A along a circumference or periphery thereof in accordance with embodiments herein. Such receiving grooves 50A may be dimensioned and configured to receive corresponding teeth 78 or castellations of the collar 40 (described later). The leading edge 61A at the second end of the head interface 44A may be a flat surface extending radially from the bore 58A.

To attach the universal head interface 44A to the main body portion 11, the central bore 58A or opening thereof is aligned with the output shaft 16 effectively extending through the detent plate 34. That is, the second end 118 of the spindle body 108 of the spindle and bearings arrangement 45 is connected to the back surface of the head interface 44A.

The central bore 58A is configured to receive at least a portion of the output shaft 16/spindle body 108 therein, according to embodiments, such that the shaft 16 extends towards the first end (near edge 61A) of the head interface 44A and at least a portion of the opening 122 of the second end 118 of the spindle body 108 is accessible through leading edge 61A and the bore 58A of the head interface 44A. An inner diameter of the central bore 58A may be dimensioned or sized based on dimensions (e.g., diameter) of the spindle body 108 to allow rotation and clearance of the spindle body 108 therein.

Further, as shown in FIG. 41, in embodiments, the central bore 58A may include notches 49A and 51A for accommodating seal 31 and bearing 28, and engaging a ball bearing, as previously described. The aforementioned dimensions also apply.

Between the flange 46A and leading edge 61A and surrounding central bore 58A of the head interface 44A are a number of interface surfaces for connection with tool head element 30, according to an exemplary embodiment. In embodiments, as shown FIG. 41, there may be a first interface portion 52A and a second interface portion 57A, with a circumferential groove 54A there between, surrounding the bore 58A. First interface portion 52A may extend axially from the flange 46A and towards the leading edge 61A. First interface portion 52A may include an outer surface having an outer diameter, in accordance with embodiments herein. Second interface portion 57A may include, in accordance with embodiments herein, a mating surface 56A and an interfacing edge 59A that has an outer diameter. The outer diameter surface of first interface portion 52A and the interface edge 59A of the second interface portion 57A are configured to interfaces with spring holder frame 42A (see FIGS. 42-43) and locking elements 60 when the tool head element 30 is attached to the main body portion 11. In embodiments, the outer diameters of the outer surface of first interface portion 52A and the edge 59A of the second interface portion 57A may be substantially equal or the same. In embodiments, the leading edge 61A has a smaller diameter than the interfacing edge 59A.

The mating surface 56A of the head interface 44A assists in alignment and engagement of locking elements 60, which is understood by the description later below with reference to FIGS. 24-27, for example. Generally, during assembly, collar 40 remains relatively stationary. In embodiments, the mating surface 56A may include a chamfered surface that extends between leading edge 61A and the interfacing edge 59A and is positioned circumferentially around bore 58A. More specifically, in one particular embodiment, the mating surface 56A is an angled surface that extends between a first diameter at the leading edge 61A and a second diameter at the interfacing edge 59A. According to embodiments, the mating surface 56A is a tapered surface or cone shaped surface that tapers outwardly relative to the axis A-A. That is, the surface 56A tapers outwardly from the first diameter at the leading edge 61A of the front end to the second diameter of interfacing edge 59A. In a non-limiting embodiment, the tapered surface is provided at an angle of about 30 degrees relative to the axis A-A.

However, as noted previously with regards to mating surface 56, the illustrated example of the mating surface 56A is not intended to be limiting in any way. That is, in other embodiments, the mating surface 56A may be a surface of different shape and is not limited to a tapered surface.

As shown in FIG. 41, for example, the circumferential groove 54A is provided axially behind the mating surface 56A, or, as previously noted, between the first and second interface portions 52A and 57A. The groove 54A is flanked by locking surfaces 53A, 55A that are part of each interface portion 52A, 57A, respectively. Locking surfaces 53A and 55A are surfaces utilized for locking and securing locking elements 60 within the head interface 44A, as discussed in greater detail below (with reference to head interface 44, but which also apply to head interface 44A).

Figure 9:
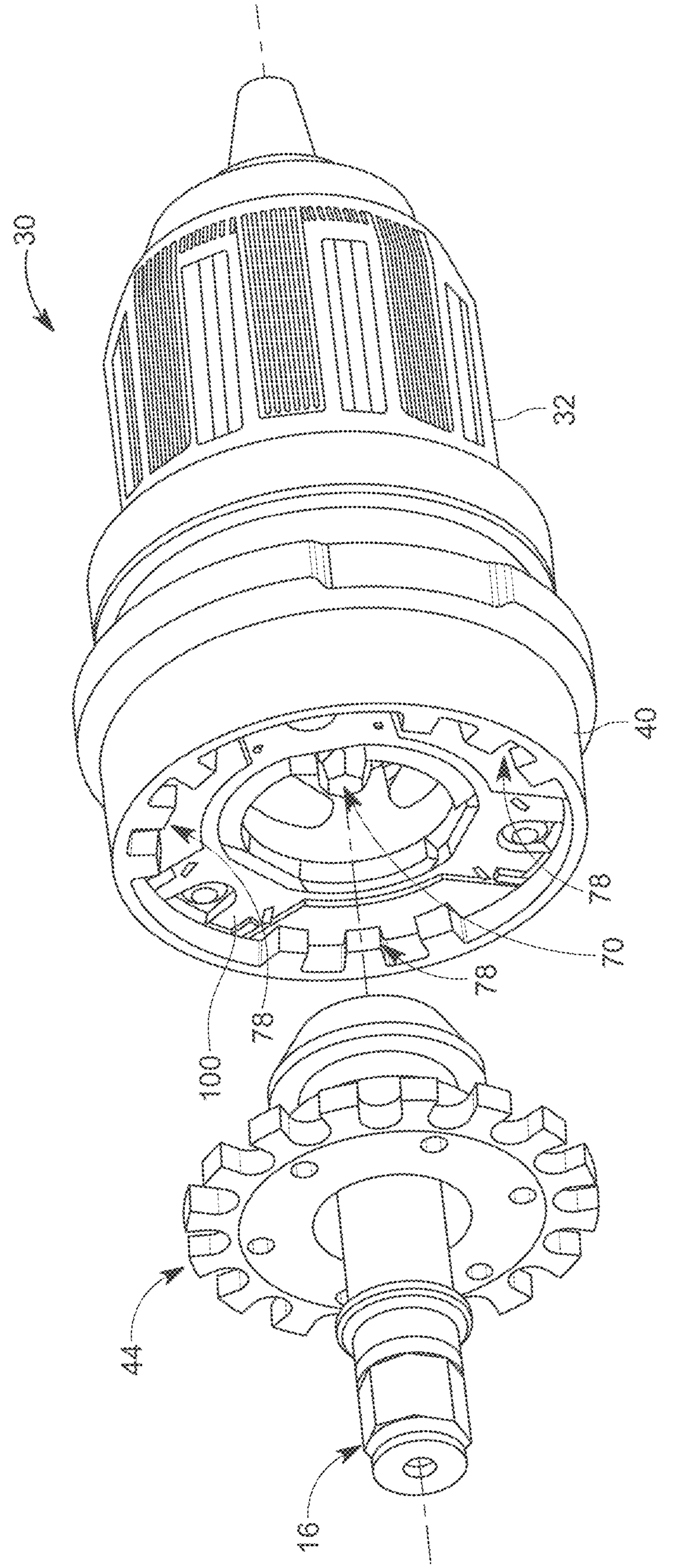
FIG. 9 shows a back angled view of the assembly of a head interface and collar in accordance with an embodiment.
Figure 10A:
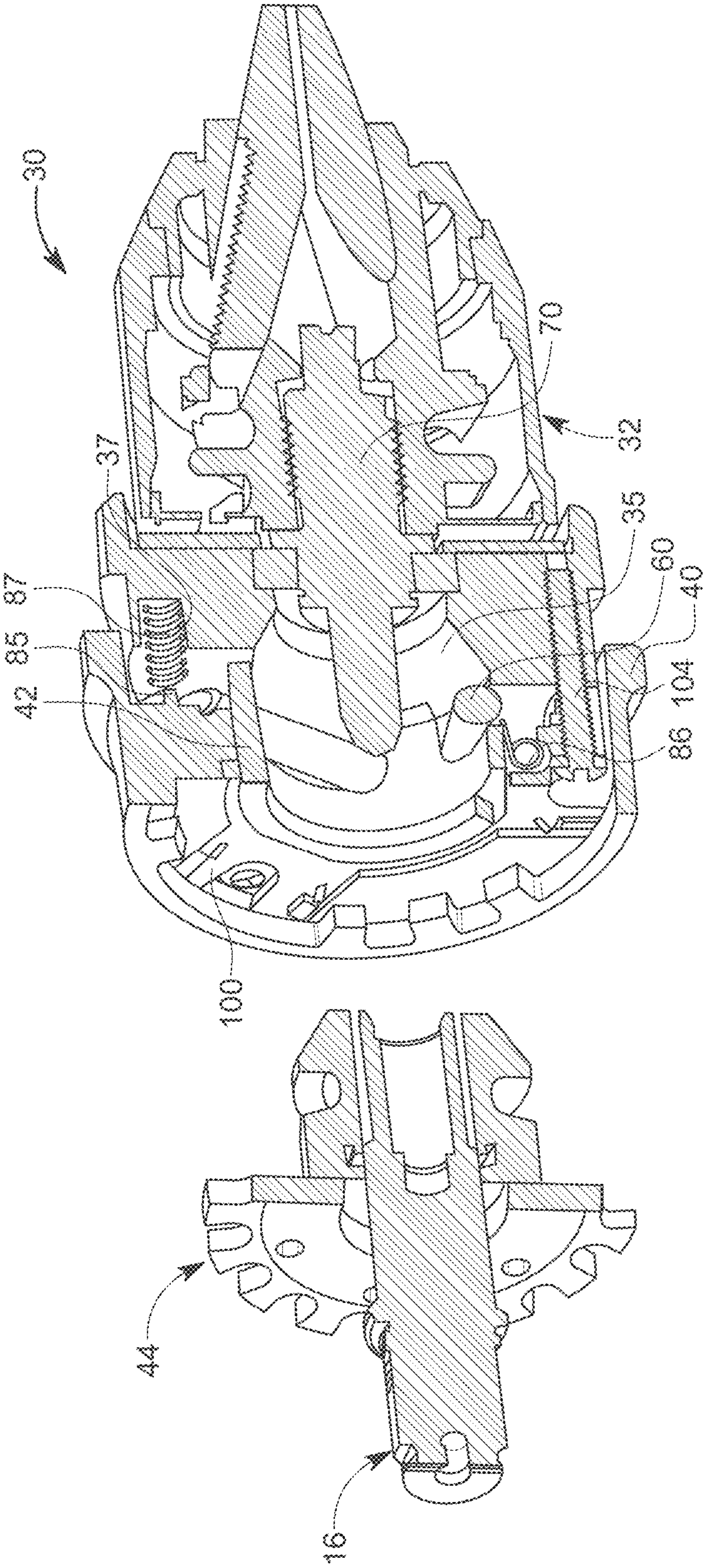
FIG. 10A and FIG. 10B show cross sectional views, in an axial direction, of the parts of FIG. 9.
Figure 10B:
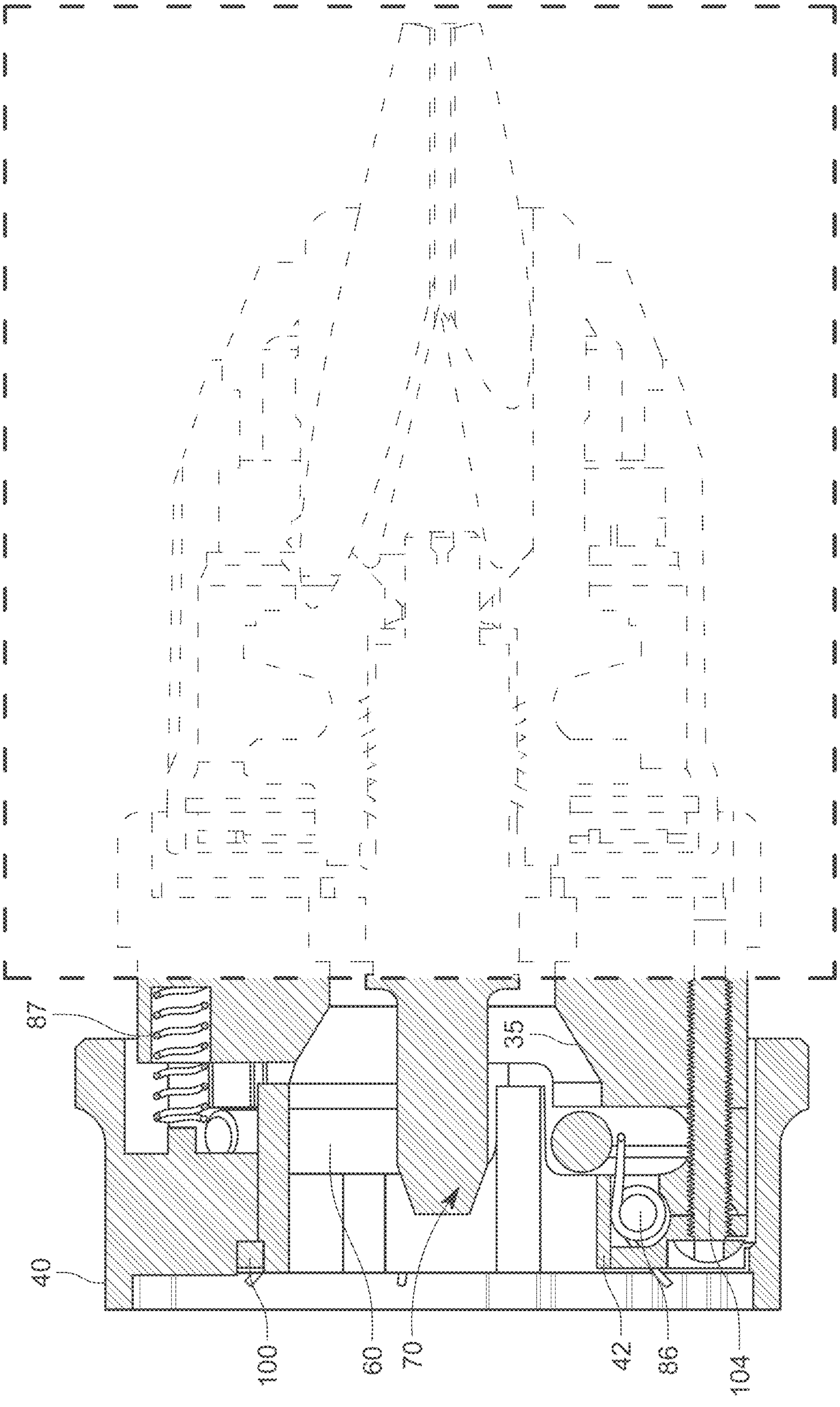

Turning now to FIGS. 9-18, features of the tool head element 30 are now described. It is noted that the following description primarily references such features with regards to universal head interface 44 as shown in FIGS. 6-8; however, this description similarly applies to use of universal head interface 44A and thus 44A may not be noted below. Nonetheless, one skilled in the art understands that the tool head element 30 is configured to operate similarly with reference to universal head interface 44A. As previously noted, each tool head element 30 is configured for selective engagement on the head interface 44 or 44A. Each tool head element 30 includes at least a tool part housing 32 and a collar 40 attached or connected thereto, such as represented by FIGS. 9-10. The tool part housing contains components and parts for the designated tool—like chuck jaws 23—and includes the input shaft 70 and one or more associated bearing(s) (not labeled, but seen in FIG. 10, for example) for rotation of input shaft 70. The tool part housing 32 includes a body with a backing surface 36 (or interface; see FIG. 3) and with holes 37 (see, e.g., FIG. 10A) for receipt of collar springs and alignment protrusions 38 (or castellations) for attaching the collar 40 thereto (see, e.g., FIGS. 19-22, as later described, showing assembly of said parts). Backing surface 36 also includes an opening in its center that includes an angled wall 35 (see, e.g., FIG. 10A and FIG. 10B) for accommodating the mating surface 56 (see, e.g., FIG. 6) of head interface 44. Input shaft 70 is configured to removably couple and effectively rotate with the output shaft 16 of the main body portion 11. FIGS. 9 and 10A generally show the method of alignment of the input shaft 70 of the tool head element 30 with the universal head interface 44 (which may contain the output shaft 16 alone or the output shaft 16 (108) of the spindle and bearings arrangement 45, and is attached to the main tool portion 11, although not shown attached in these figures). FIG. 10B shows a cross sectional view, in an axial direction, of the assembled spring cover 100, collar 40, and spring holder frame 42 et al. (described below) for attachment to the head interface 44. Upon coupling and providing power to the tool 10, speed and torque from output shaft 16 are applied/transferred to input shaft 70, e.g., for rotation thereof (and thus, rotation/movement of any tool, e.g., a drill bit tool bit holder portion 23 attached to the tool head element 30). In an embodiment, the speed and torque from output shaft 16 are applied/transferred to input shaft 70 via the spindle and bearings arrangement 45. An exemplary embodiment of features of input shaft 70 is described later with reference to FIGS. 33-37.

According to embodiments herein, the tool head element 30 includes the mechanisms for quick attachment and quick release of the tool head element from the main body portion, including, for example, collar 40 and spring holder frame 42 (or 42A), and locking elements 60. In embodiments, the collar 40 of the tool head element 30 is attached or connected to the tool part housing 32 (see, e.g., FIG. 10A). The collar 40 includes a number of locking elements 60 therein for locking the tool head element 32 to the main body portion 11 (via head interface 44 or 44A). In embodiments, the locking elements 60 may be pins or rolling elements. In an embodiment, the number of locking elements 60 is two or more. Any multiples of locking elements may be utilized; however, for illustrative purposes only, the drawings (e.g., see FIG. 17) show the use of three (3) locking elements 60 in the collar 40. Generally, locking elements 60 are configured to move radially (relative to the axial direction or axis) inward and outward based on the forces (e.g., spring forces, or forces from the head interface 44) applied thereto. In accordance with an embodiment, when moving radially e.g., moving along the angled surface of mating surface 56, 56A of the head interface, an angle of the mating surface 56, 56A (or its taper), and thus the locking elements 60 are configured to move (roll) relative to the axis A-A, is an acute angle $\alpha$ (see FIG. 27). More specifically, the angle $\alpha$ of mating surface 56, 56A may be less than ninety degrees relative to axis A-A. In embodiments, the angle $\alpha$ may be between approximately 20 degrees and approximately 75 degrees, inclusive. In embodiments, the angle $\alpha$ may be approximately 45 degrees. In yet another embodiment, the tapered mating surface 56, 56A is provided at an angle of about 30 degrees relative to the axis A-A, and thus locking elements 60 are configured to move at a similar or same angle relative to the axis A-A during attaching or removing the tool head element. Further details regarding the locking elements 60 are discussed later below.

Figure 11:
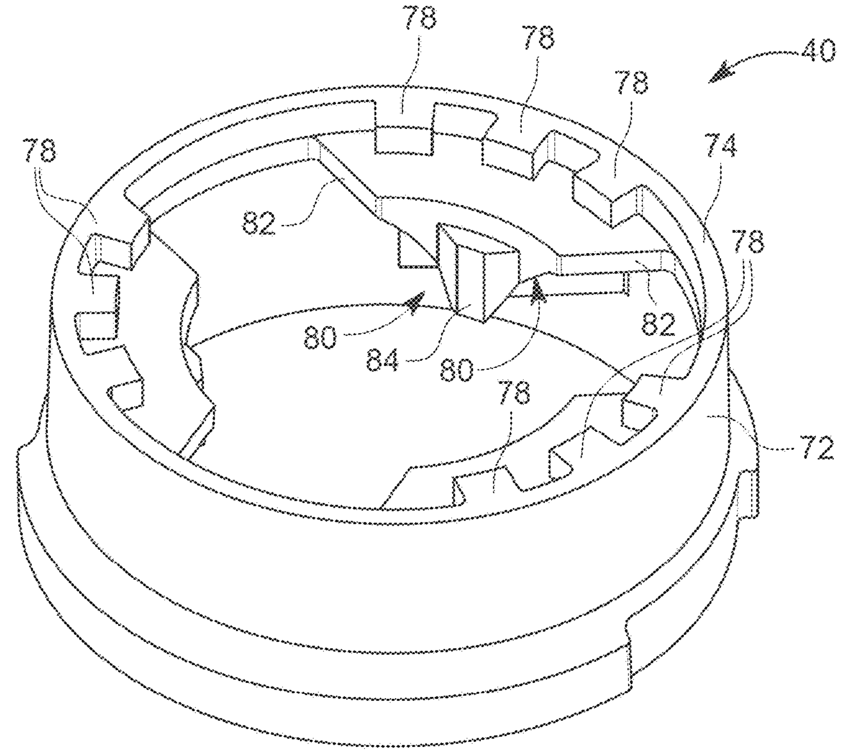
FIGS. 11-12 show a first isometric view and a second isometric view, respectively, of collar provided on a tool head element used in the power tool of FIG. 1 in accordance with an embodiment.
Figure 12:
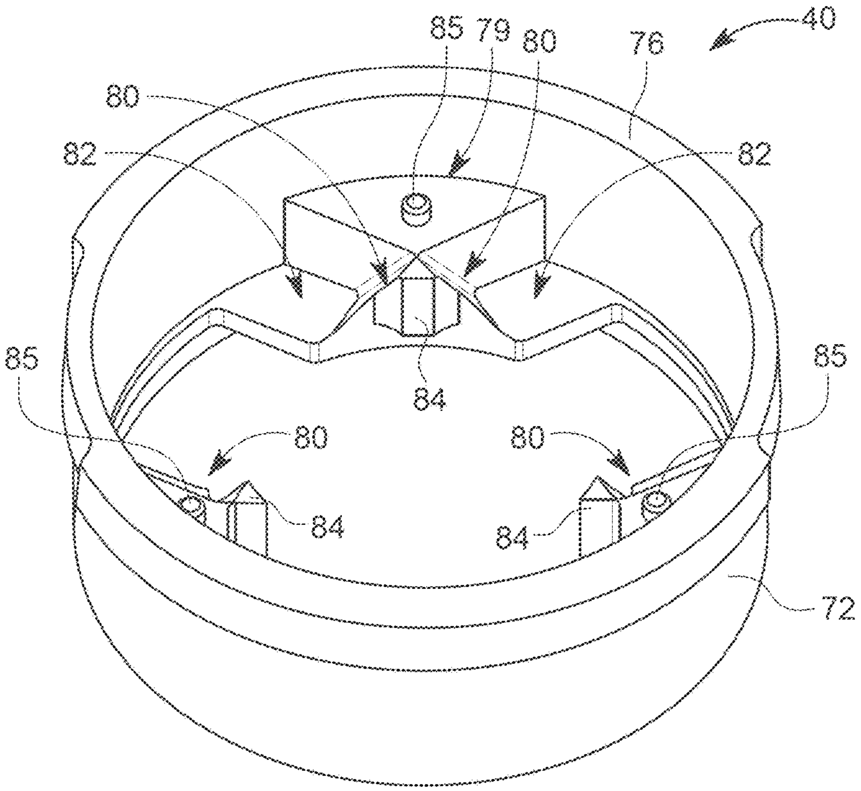
Figure 23:
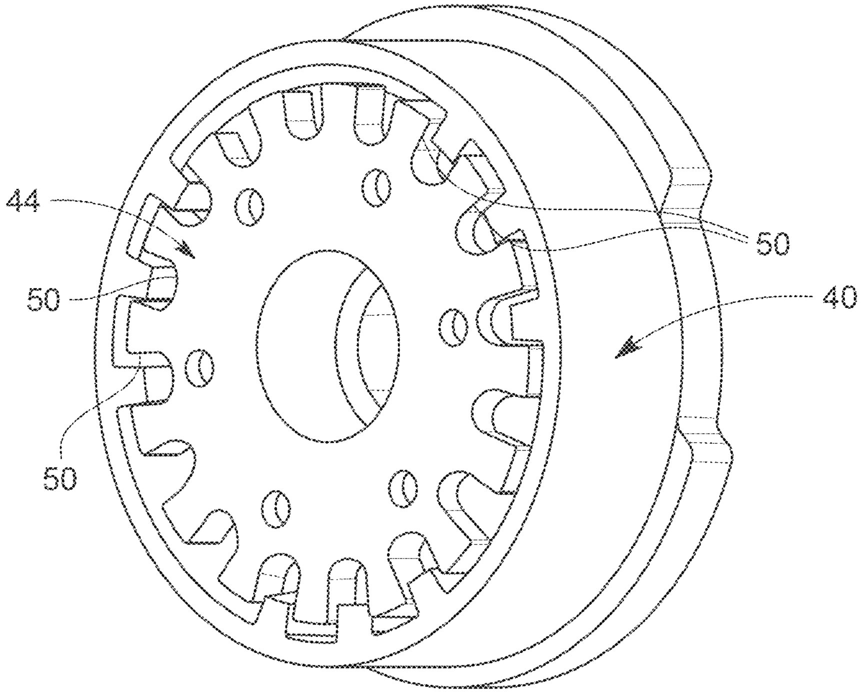
FIG. 23 shows a back end view of the head interface assembled in the collar in accordance with an embodiment.

FIGS. 11-12 show a first (back) view and a second (front) view of the collar 40 in accordance with embodiments herein. Collar 40 has a wall 72 that is generally circular or round and has a thickness extending in the axial direction. An outer surface of the wall 72 is designed for a user to grasp and move as needed for application, removal, or adjustment of the tool head element 32. According to embodiments, the collar 40 includes a number of teeth 78 (or castellations) such as shown in FIG. 11, configured to engage the corresponding receiving grooves 50 on periphery of the head interface 44 (or 50A on 44A). In embodiments, the teeth 78 are provided at a first end 74 (or back) of the collar 40. As previously mentioned, when the tool head element 30 is attached to the head interface 44, the teeth 78 may be inserted into receiving grooves 50 thereof, such as shown in FIG. 23. Such connection assists in axially and rotationally locking the housing 32 of the tool head element 30 to the main body portion 11. In embodiments, the collar 40 may be configured for axial and/or rotational movement about the axis A-A, without removing the tool head element 30 off of the head interface 44, to rotate a position of the tool head element 30 via withdrawing the teeth 78 from the receiving grooves 50 and rotationally repositioning (i.e., rotating) the teeth 78 into the receiving grooves 50. Such movement of the collar allows a user to change to different rotational positions when needed in order to adjust an angle of the drill, tool, etc. while working, for example.

Figure 15:
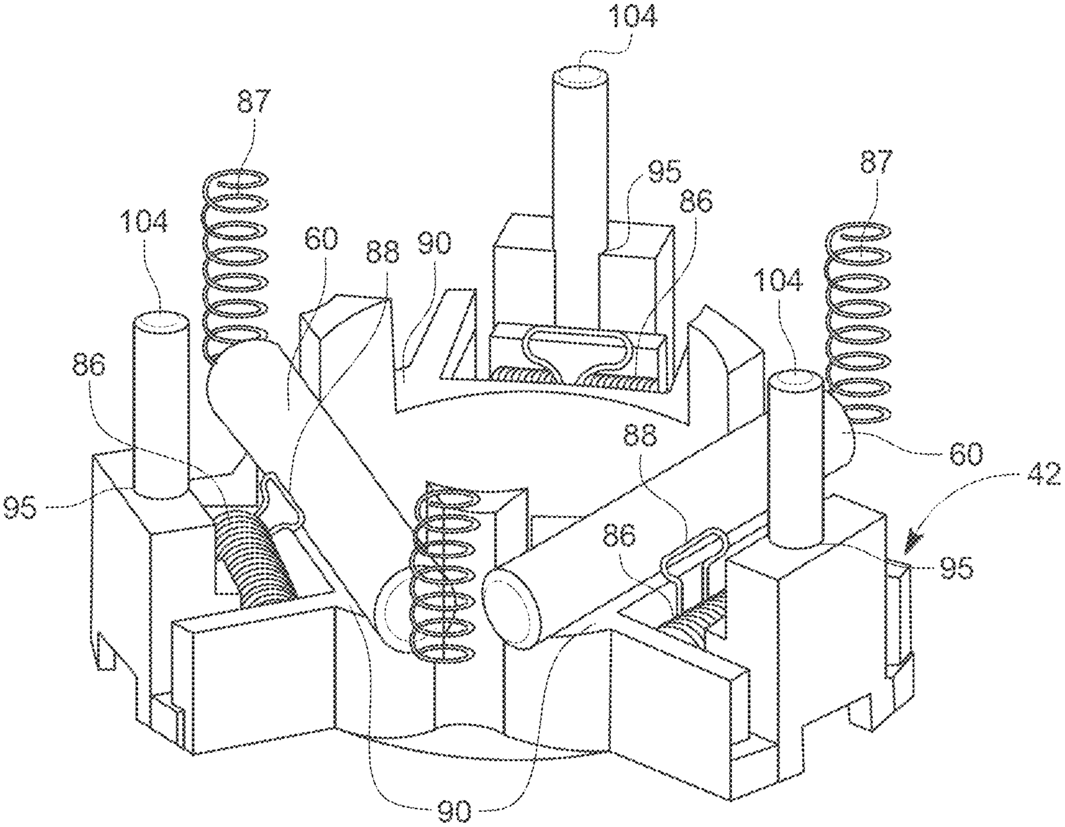
FIG. 15 shows an isometric view of the locking elements and biasing elements used on a spring holder frame within the collar in accordance with an embodiment.
Figure 21:
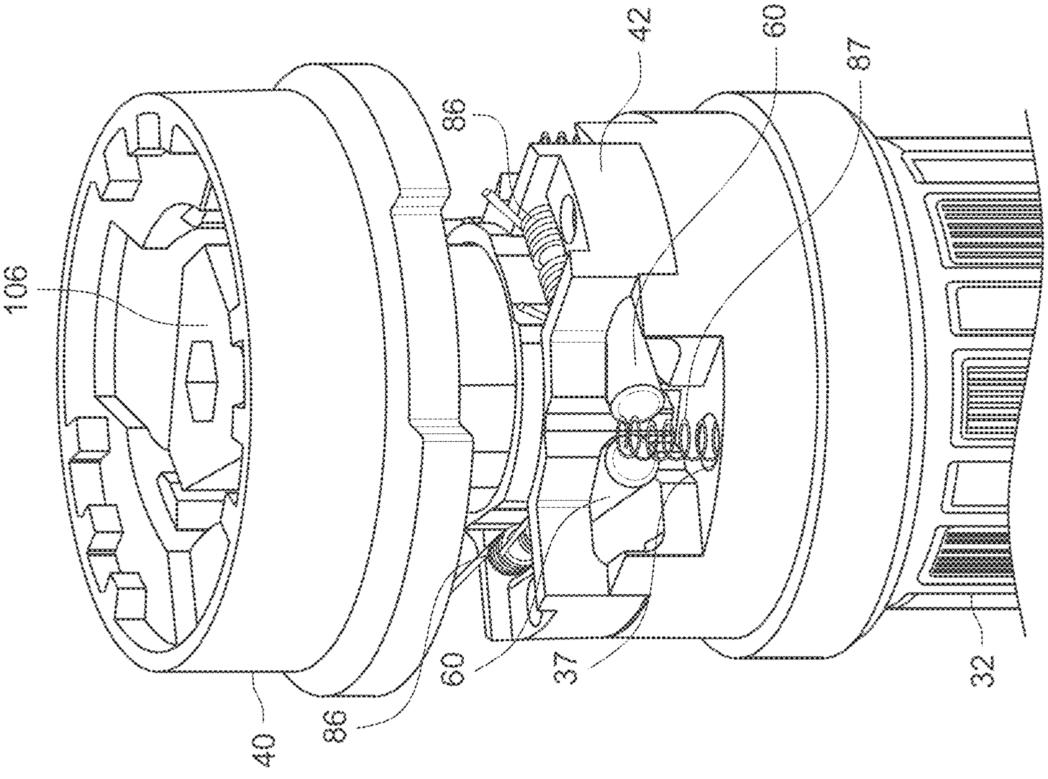

Also provided in the collar 40 are a number of collar springs 87, as seen in FIGS. 3 and 15, for example. Collar springs 87 are configured to bias the collar 40 in an outmost axial position, or a first collar position, relative to the tool part housing 32. As shown in FIG. 21, for example, holes 37 may be provided in a backing surface 36 of the tool part housing 32, for receipt of one end of each collar spring 87. A second end of the collar spring 87 may be aligned with pin 85 (see FIG. 12) provided on a front side of each alignment mechanism 79. In a non-limiting embodiment, collar springs 87 may be coil springs. However, collar springs 87 may also include other types of elements such as beam springs and/or compression springs in embodiments herein.

Figure 13:
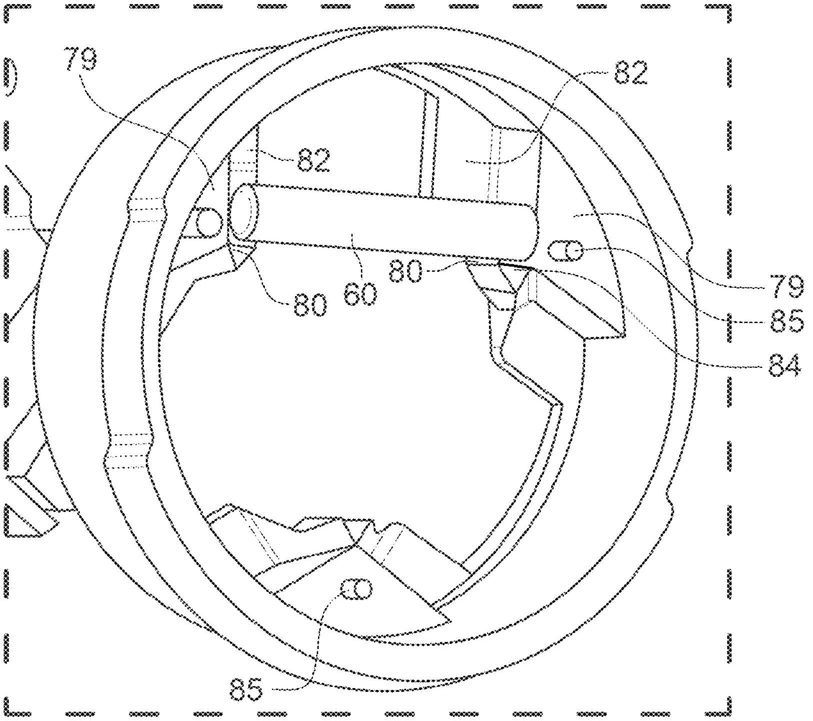
FIGS. 13-14 show movements of a locking element within the collar of FIGS. 11-12 in accordance with an embodiment.
Figure 14:
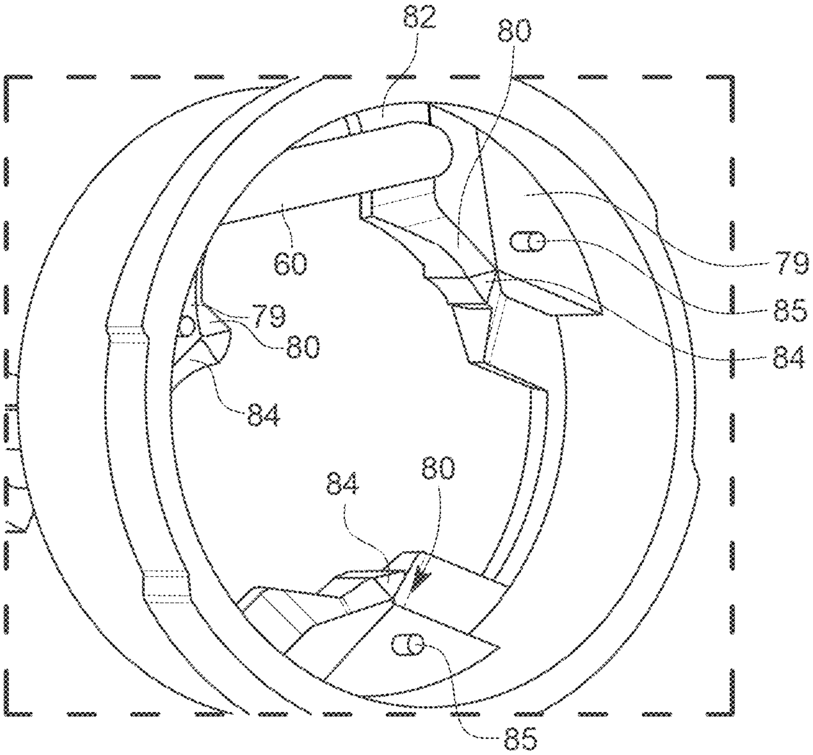

In embodiments, between its first end 74 and a second end 76 (or front), the collar 40 may include at least one alignment mechanism 79 therein (see, e.g., FIG. 12), having at least one ramped surface 80, extending radially towards a center thereof. Such alignment mechanism(s) 79 are designed for cooperation with and for guiding the locking elements 60 during axial movement of the tool head element 30 relative to the main body portion 11; that is, during attachment or removal the tool head element 30 to/from the main body portion. In an embodiment, the number of ramped surfaces 80 is two or more per alignment mechanism 79. Any multiples of ramped surfaces may be utilized; however, for illustrative purposes only, the drawings (e.g., see FIGS. 11-12) show the use of six (6) ramped surfaces 80 on three (3) alignment mechanisms 79 of the collar 40. Each ramped surface 80 is connected to a bottom wall 82 that extends radially towards the center of the collar 40. From the bottom wall 82, each of the ramped surfaces 80 extend at an angle towards an adjacent ramped surface 80. As shown in FIGS. 13-14, each locking element 60 may be configured to extend between two alignment mechanisms 79. Ends of locking elements 60 generally sit on bottom walls 82, such that the locking elements 60 extend therebetween. The ramped surfaces 80 of the alignment mechanisms are utilized during removal or unlocking of the tool head element 30 from the power tool 10. More specifically, an end of each locking element 60 is received on the ramped surface 80 and configured to move along the ramped surface 80 and from the bottom wall 82 based on the removal action of the tool head element 30. Such movement is described later with reference to FIGS. 28, 30, and 32, for example.

In an embodiment, each ramped surface 80 flanks a wedge element 84. Wedge elements 84 are provided as part of the alignment mechanisms 79 to assist in removal of the tool head element 30 from the main body portion 11. Generally, the wedge elements 84 are configured to drive locking elements 60 outwardly relative to the axis A-A and to move the locking elements 60 out of the circumferential groove 54 of the head interface 44, i.e., outside of the outer diameter of the interfacing edge 59 so that each locking element 60 is free to move out and along the edge 59, to remove the tool head element 30 from the main body portion 11. More specifically, as evident via the description with regards to FIG. 30, the wedge elements 84 are designed for pushing the locking elements 60 relatively outwardly from the circumferential groove 54 and against forces of biasing elements 86 according to embodiments.

Each locking element 60 is biased inwardly towards the input shaft 70 by biasing elements 86 provided on a spring holder frame 42, according to embodiments herein. Biasing elements 86 may be torsion springs, shown in the exemplary illustrative embodiment of FIGS. 15 and 20, for example, that are designed with a leg portion 88 that is configured to bias or hold each locking element 60 at a biased position within spring holder 42. Biasing elements 86 are also configured to push locking elements 86 into the circumferential groove 54 of the head interface 44 and assist in locking the tool head element 30 onto the main body portion 11.

While the biasing elements 86 may be illustrated in the figures and described as torsion springs, the type of spring or biasing element used in the tool head element 30 is not meant or intended to be limiting. In embodiments, biasing elements 86 may include other types of elements such as beam springs and/or compression springs. In some embodiments, a combination of different types of springs or biasing elements may be utilized.

Figure 16:
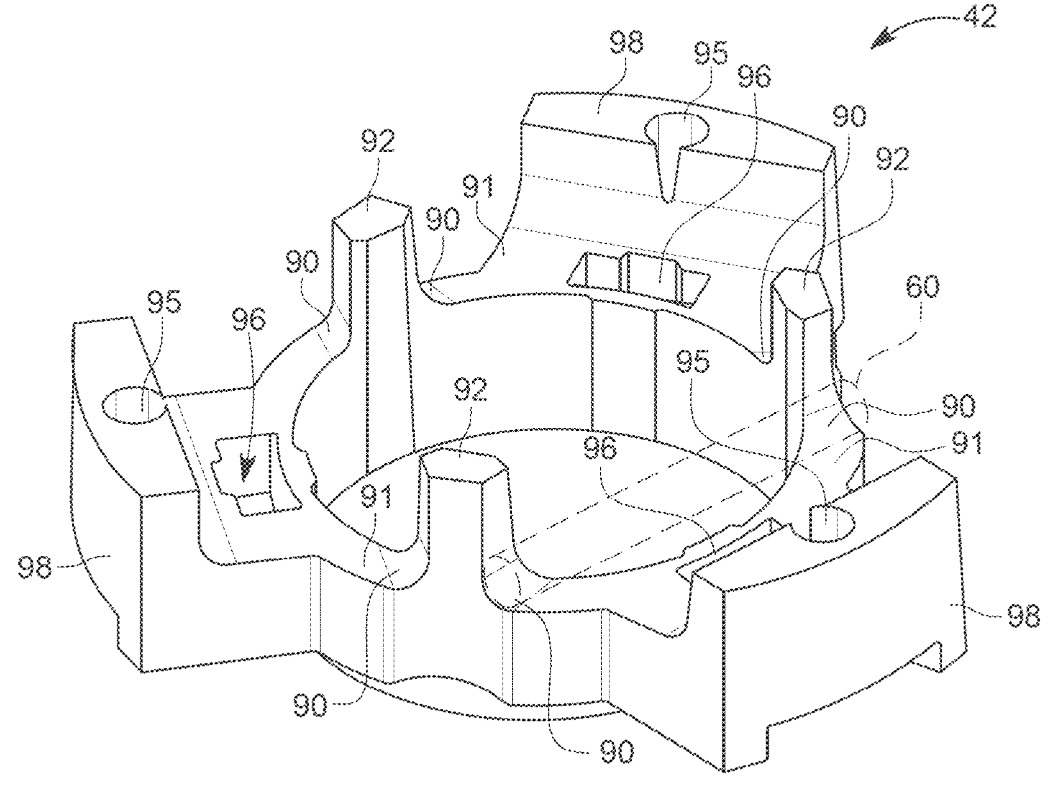
FIGS. 16-17 show a first isometric view and a second isometric view, respectively, of the spring holder frame used in the power tool of FIG. 1 in accordance with an embodiment.
Figure 17:
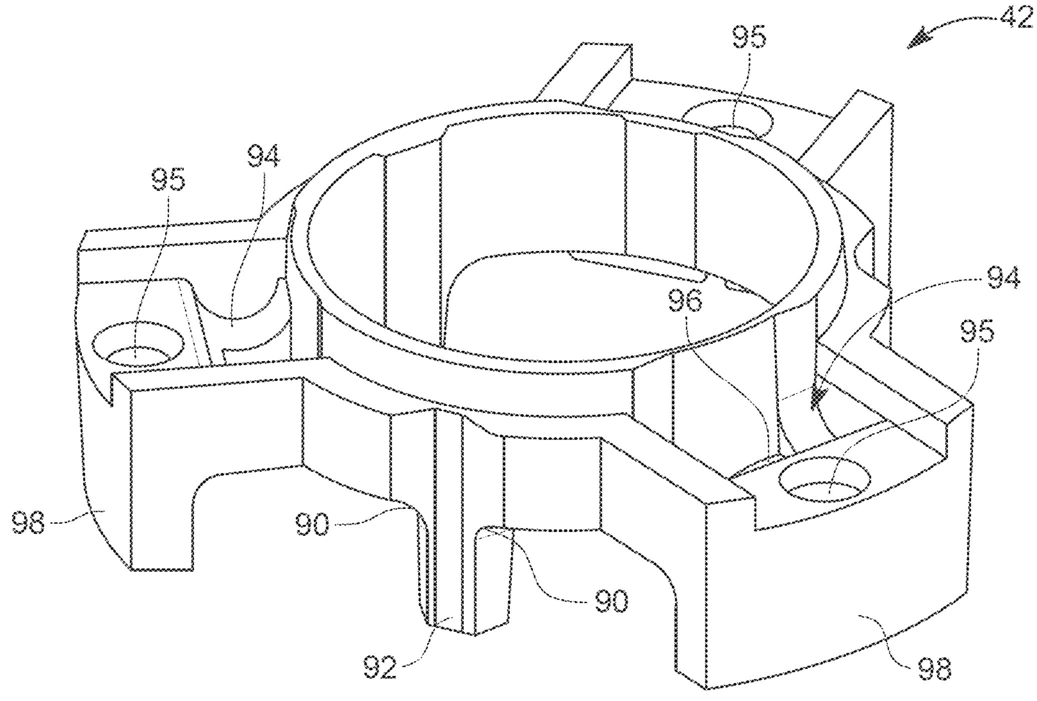

FIGS. 15-16 show a first (back) view whereas FIG. 17 shows a second (front) view of the spring holder frame 42 in accordance with embodiments herein. As illustrated, spring holder frame 42 may have a central opening therein to accommodate the shafts 16 (108) and 70 for connecting. A diameter of this central opening may be used to pilot the tool head interface 30 onto the head interface 44. A back of the spring holder frame 42 includes divots 90 therein. The divots contact travel groove 91 and extension 92; groove 91 allows movement or travel of the locking elements 60 during locking of the tool head element 30 onto the head interface 44. Each travel groove 91 has a bottom out surface that allows movement between that surface and a mating surface on the tool part housing for each locking element. Between each of the divots 90 is an extension leg 92 that extends axially and assists in containing the locking elements 60 within an area of the collar 40. Further, alignment walls 98 are provided on an opposite side of the divots 90. Alignment walls 98 are provided for alignment and connection onto the backing surface 36 of the tool head element 30, described later below.

A front of the spring holder frame 42, as shown in FIG. 17, includes pockets 94 therein for receipt of each of the biasing elements 86 therein. In particular, FIG. 17 shows a first side of each pocket 94 used to hold each biasing element 86. As visible in FIG. 16, a hole 96 for receipt of the leg portion 88 of biasing element 86 is provided in each pocket 94; hole 96 may be provided between each divot 90 and alignment wall 98. Each hole 96 may be provided in a center of the pocket 94. Each pocket 94 and hole 96 may be sized or dimensioned based on a size and/or dimensions of the received biasing element 86 and leg portion 88, respectively, according to embodiments. Accordingly, when assembled, the leg portion 88 of biasing element 86 extends through the hole 96, as a body of the biasing element 86 is contained within the pocket 94. The leg portions 88 of the biasing elements 86 hold the locking elements 60 in position within the divots 90 of the spring holder frame 42. Such features are shown in FIG. 15, for example.

Figure 42:
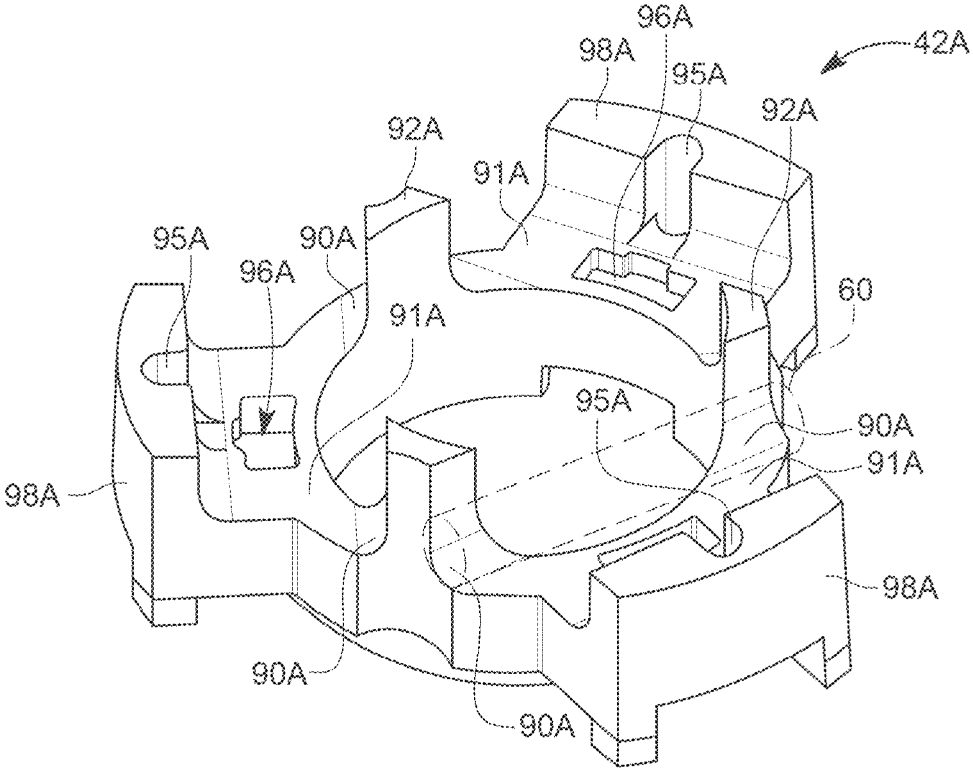
FIGS. 42-43 show a first isometric view and a second isometric view, respectively, of the spring holder frame used in the power tool of FIG. 1 in accordance with another embodiment.
Figure 43:
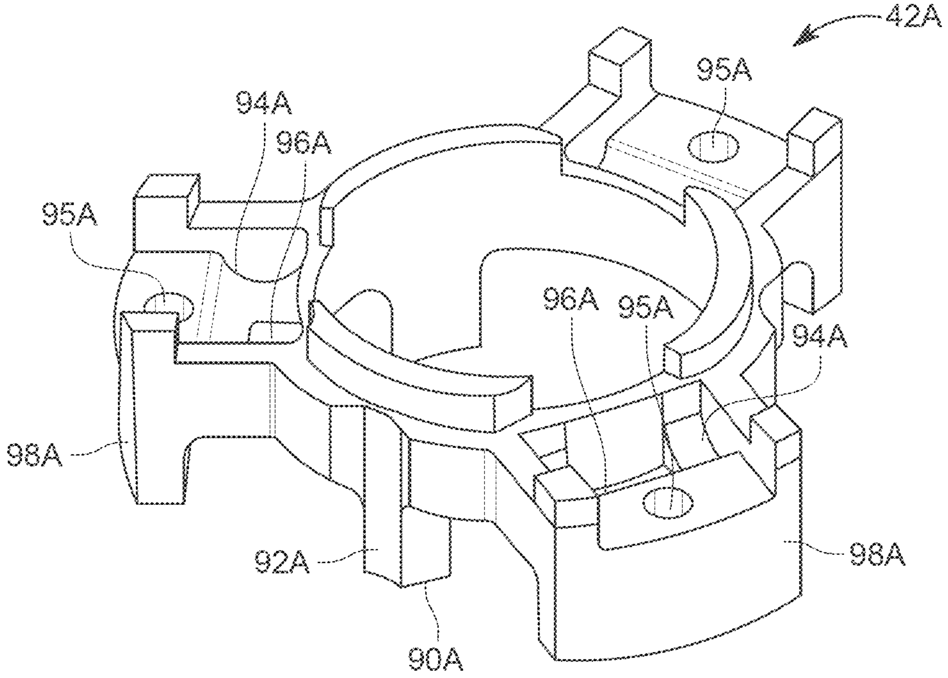

In another embodiment where universal head interface 44A may be utilized, spring holder frame 42A, shown in FIGS. 42-43, may be implemented in accordance with embodiments. Again, for purposes of clarity and brevity, like elements and components throughout FIGS. 42-43 are labeled with similar designations and numbering (plus "A") as discussed with reference to FIGS. 16-17 and may not be discussed entirely in detail herein, but are understood to one of ordinary skill in the art that various features are similar to those features previously discussed without being limited solely to the illustrated embodiments. FIG. 42 shows a first (back) view whereas FIG. 43 shows a second (front) view of the spring holder frame 42A in accordance with embodiments herein. As previously described with reference to frame 42, each locking element 60 may be biased inwardly towards the input shaft 70 by biasing elements 86 provided on spring holder frame 42A, according to embodiments herein. As illustrated, spring holder frame 42A may have a central opening therein to accommodate the shafts 16 (108) and 70 for connecting. A diameter of this central opening may be used to pilot the tool head interface 30 onto the head interface 44A. A back of the spring holder frame 42A includes divots 90A therein. The divots contact travel groove 91A and extension 92A; groove 91A allows movement or travel of the locking elements 60A during locking of the tool head element 30 onto the head interface 44A. Each travel groove 91A has a bottom out surface that allows movement between that surface and a mating surface on the tool part housing for each locking element. Between each of the divots 90A is an extension leg 92A that extends axially and assists in containing the locking elements 60 within an area of the collar 40. Further, alignment walls 98A are provided on an opposite side of the divots 90A. Alignment walls 98A are provided for alignment and connection onto the backing surface 36 of the tool head element 30, described later below.

The front of the spring holder frame 42A, as shown in FIG. 43, includes pockets 94A therein for receipt of each of the biasing elements 86 therein. In particular, FIG. 43 shows a first side of each pocket 94A used to hold each biasing element 86. A hole 96A for receipt of the leg portion 88 of biasing element 86 is provided in each pocket 94A; hole 96A may be provided between each divot 90A and alignment wall 98A. Each hole 96A may be provided in a center of the pocket 94A. Each pocket 94A and hole 96A may be sized or dimensioned based on a size and/or dimensions of the received biasing element 86 and leg portion 88, respectively, according to embodiments. Accordingly, when assembled, the leg portion 88 of biasing element 86 extends through the hole 96A, as a body of the biasing element 86 is contained within the pocket 94A. The leg portions 88 of the biasing elements 86 hold the locking elements 60 in position within the divots 90A of the spring holder frame 42A, much like the features are shown in FIG. 15, for example.

Figure 18:
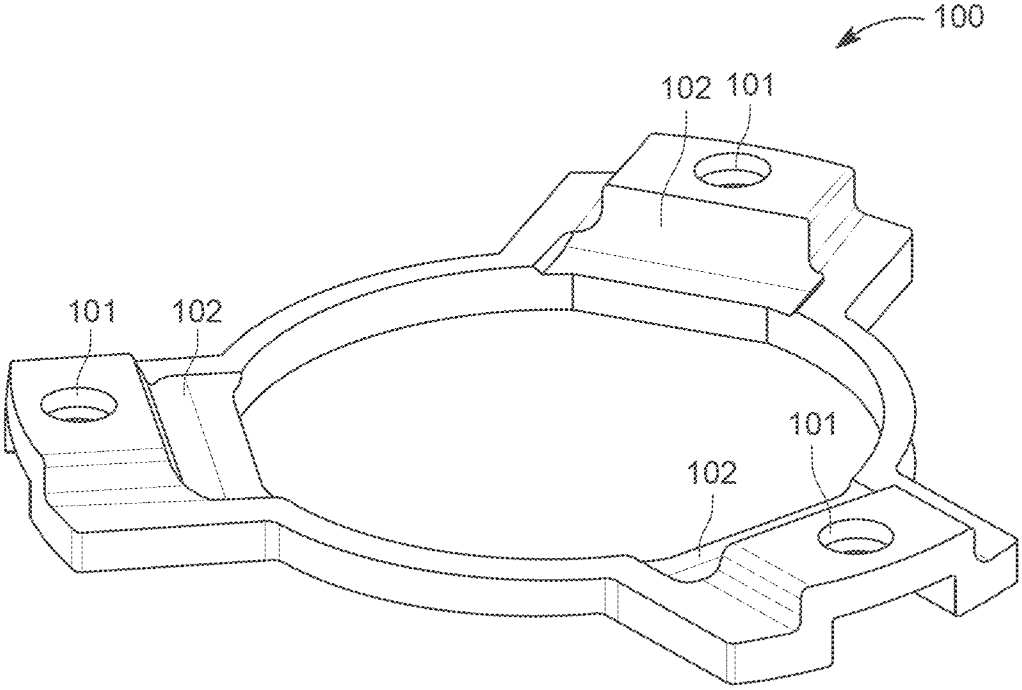
FIG. 18 shows a first isometric view of a spring cover in accordance with an embodiment.

To assist in containing the biasing elements 86 within the pockets 94 (or 94A) as well as within the collar 40, a spring cover 100 is provided. FIG. 18 shows a first (back) view of spring cover 100 in accordance with an embodiment (as second (front) view of spring cover 100 may be seen in FIG. 22, for example). Spring cover 100 may include a retaining ring or frame that is generally round or generally circular, with a central opening therethrough, according to embodiments. The ring or frame of spring cover 100 is sized and designed to align with, and secure, spring holder frame 42 (see FIGS. 9, 10A, and 22), among other parts, within the tool part housing 32. Central opening of the spring cover 100 may be sized and designed based on central opening of spring holder frame 42, according to embodiments herein, thereby providing access to the input shaft 70 for connecting to shaft 16 (108). The frame may include multiple connecting flanges therearound for attachment of the spring cover 100, according to an embodiment. In an embodiment, spring cover 100 includes on its back side a corresponding number of depressions 102 that contain and form a second side of the pockets 94 or 94A. In an embodiment, the depressions 102 may be provided within or adjacent to the connecting flanges. Accordingly, when the spring cover 100 is secured, the biasing elements 86 are contained between the spring holder frame 42 or 42A and spring cover 100.

The spring holder frame 42 and 42A each includes a number of fastener holes 95 therein for receipt of fasteners 104 (e.g., screws) that are used to connect the parts of the collar 40. Similarly, in an embodiment, the spring cover 100 includes a number of fastener holes 101 (see FIG. 18) therein for receipt of fasteners 104 (shown in FIG. 15 and FIG. 22, for example). According to embodiments, the fastener holes 101 may be provided through the connecting flanges of the spring cover 100. The fastener holes 101 may be adjacent to the depressions 102, for example. In the exemplary illustrated embodiment, spring cover 100 includes a retaining ring or frame connecting three flanges with fastener holes 101 (shown in FIG. 18).

However, it should be noted that the illustrated spring cover 100 is not intended to be limited to the illustrated embodiment. That is, a single retaining ring with flanges need not be provided as the spring cover 100. Instead, according to an embodiment, individual pieces (e.g., three) may be utilized for holding and maintaining bias/compression of the biasing elements 86. Accordingly, when each part of the spring cover 100 is secured, the biasing elements 86 are contained.

Figure 20:
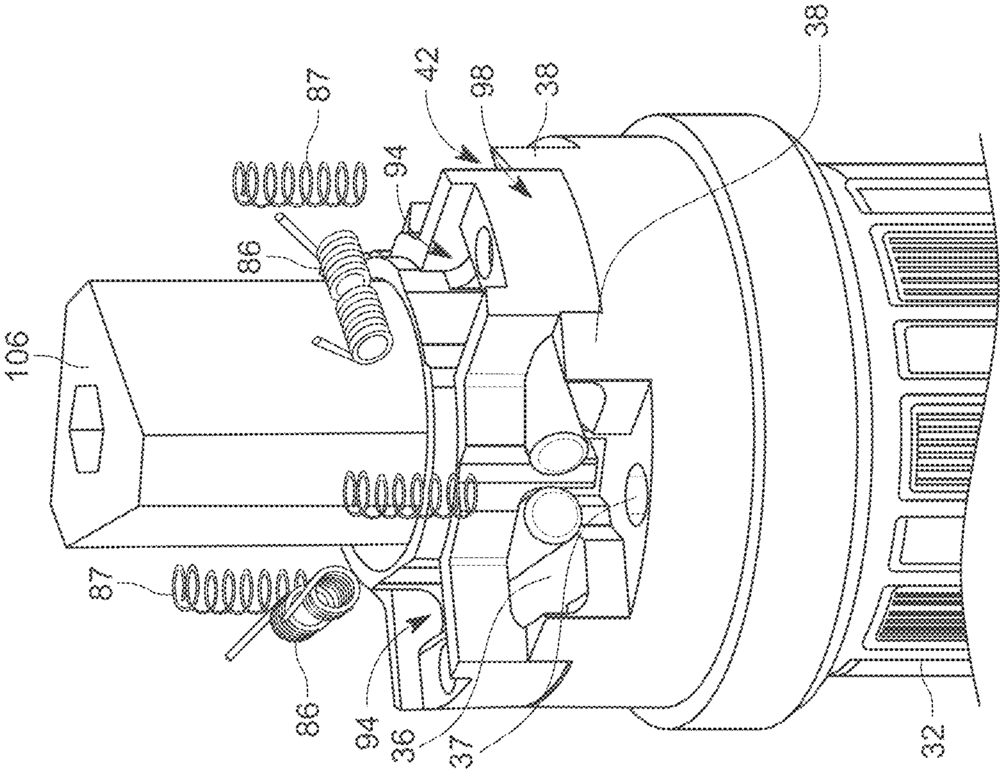
FIGS. 19-22 show a process of assembling and mounting the collar and its contained parts onto a tool head element in accordance with an embodiment.
Figure 19:
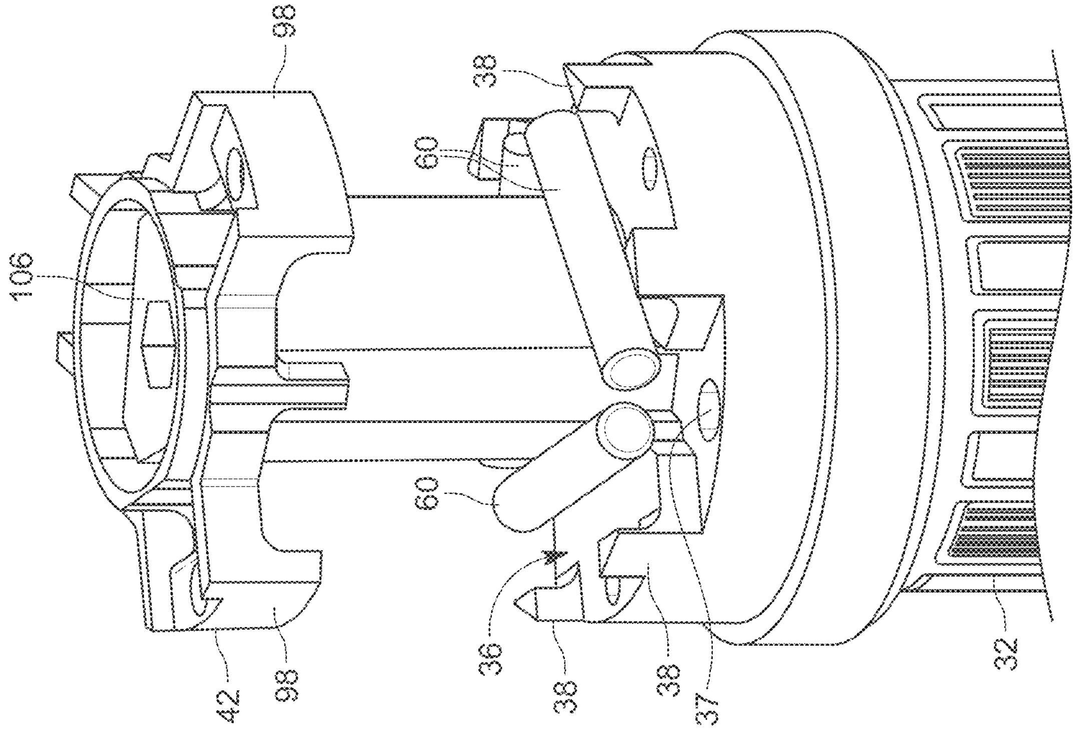
Figure 22:
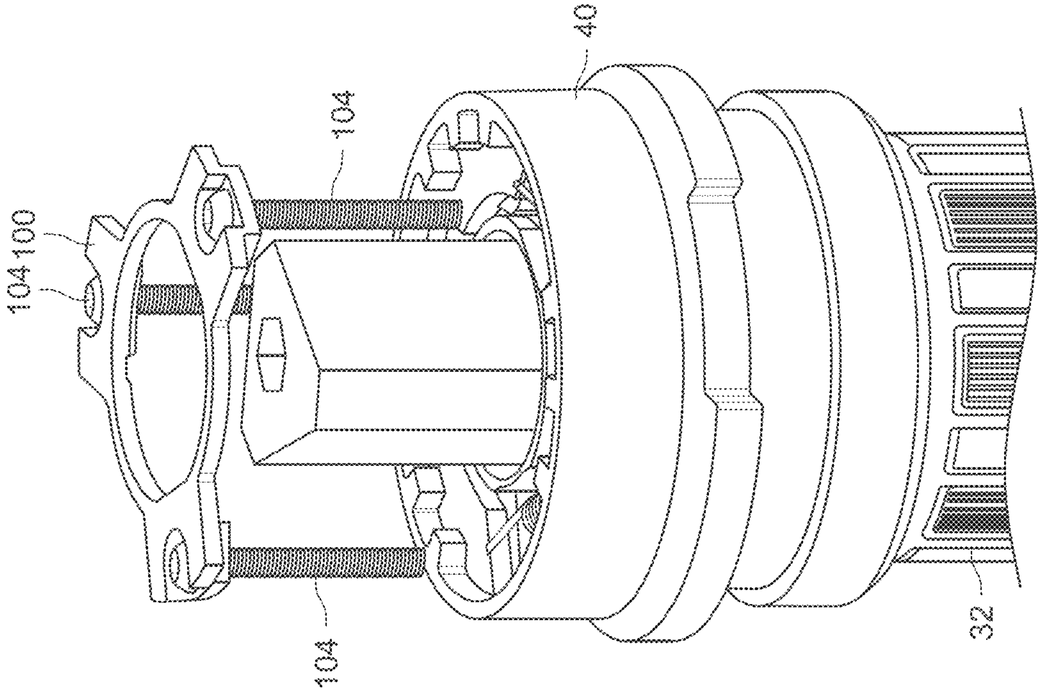

An example of the assembly of the collar 40 onto the tool part housing 32 is shown in FIGS. 19-22. Such is described with reference to features of spring holder frame 42, but this description similarly applies to spring holder frame 42A even if not entirely noted herein. Assembly of the collar 40 may be assisted via using a temporary alignment gauge 106, for example, that is inserted into the tool part housing 32, e.g., through a center thereof (through backing surface 36), as shown in FIG. 19. Each of the locking elements 60 (in this illustrated case, there are three locking elements 60) are placed on the backing surface 36 towards and around a center opening therein. The spring holder frame 42 (or 42A) is then assembled onto the alignment gauge 106 and moved therealong towards backing surface 36, as represented in FIG. 19. Alignment walls 98 of the spring holder frame 42 are aligned or placed and assembled between alignment protrusions 38 of the backing surface 36, as shown in FIG. 20. Thereafter, biasing elements 86 are placed in pockets 94 with their leg portions 88 extending through the holes 96 in spring holder frame 42. This allows the leg portions 88 to assist in holding or biasing the locking elements 60 upon assembly of the collar 40. Collar springs 87 are also inserted into the holes 37 of the backing surface 36. Collar 40 is then placed onto the alignment gauge 106 and moved towards the assembly on the tool part housing 32 to encase or enclose the spring holder frame 42 and at least part of the backing surface 36, as shown in FIGS. 21-22. Then spring cover 100 is placed onto the collar 40. Specifically, the back of spring cover 100 is faced towards the collar 40 such that depressions 102 align with the biasing elements 86 to form the aforementioned pockets 94, shown in FIG. 22. Also, the fastener holes 101 of spring cover 100 are aligned with the fastener holes 95 of the spring holder frame 42 such that fasteners 104 may be inserted and fastened therethrough. The fasteners 104 are tightened to secure the spring cover 100 and collar 40 and assembly of parts therein to the tool part element 30. The spring cover 100 may be received within the collar 40 as shown in FIG. 9. The alignment gauge 106 is then removed from the assembly.

However, the order of assembly as shown in FIGS. 19-22 is not intended to be limiting. According to another embodiment, the collar 40, spring holder frame 42, and spring cover 100 may be assembled, with the biasing elements 86 (springs) being secured thereafter. The entire assembly may be then secured together.

As shown in FIG. 9, then, once the collar 40 is assembled onto the tool part element 30, the teeth 78 of the collar 40 are accessible. As a result, when the tool head element 30 is attached to the head interface 40, the teeth 78 may be inserted into receiving grooves 50 thereof, such as shown in FIG. 23.

Figure 24:
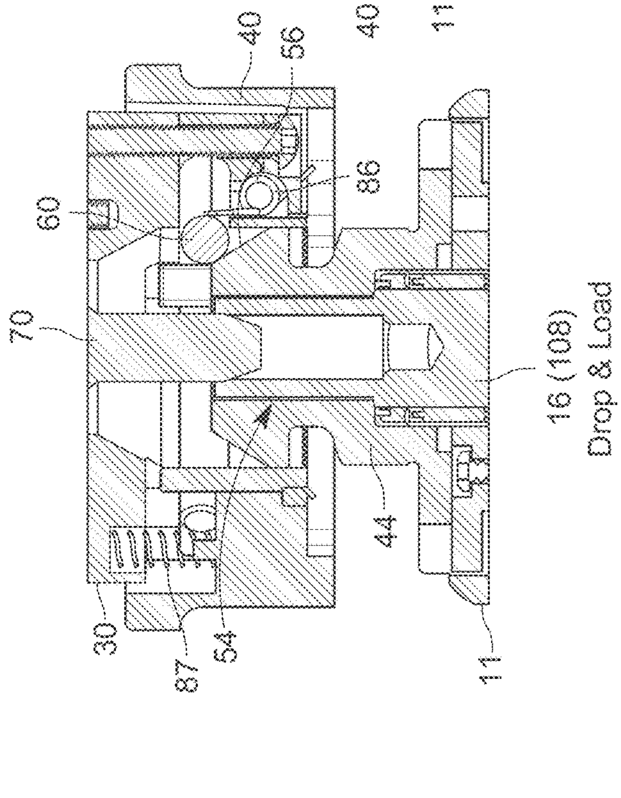
FIGS. 24-26 show cross-sectional views of a process for assembling or locking a tool head element onto a main body portion of the power tool of FIG. 1 in accordance with an embodiment.
Figure 25:
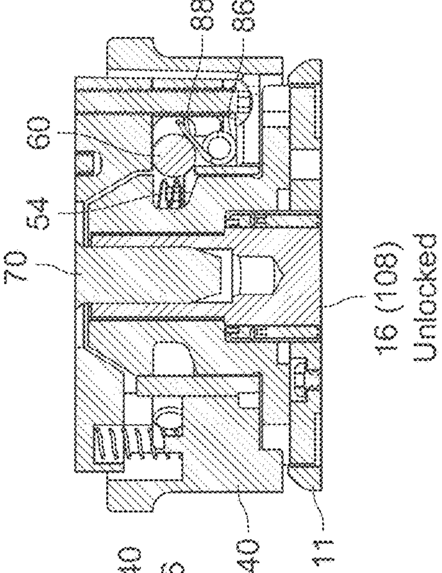
Figure 26:
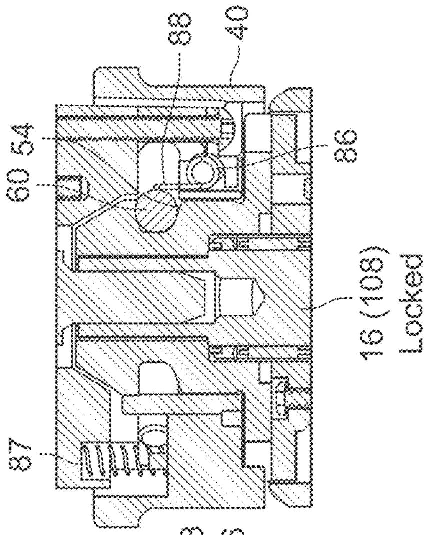
Figure 27:
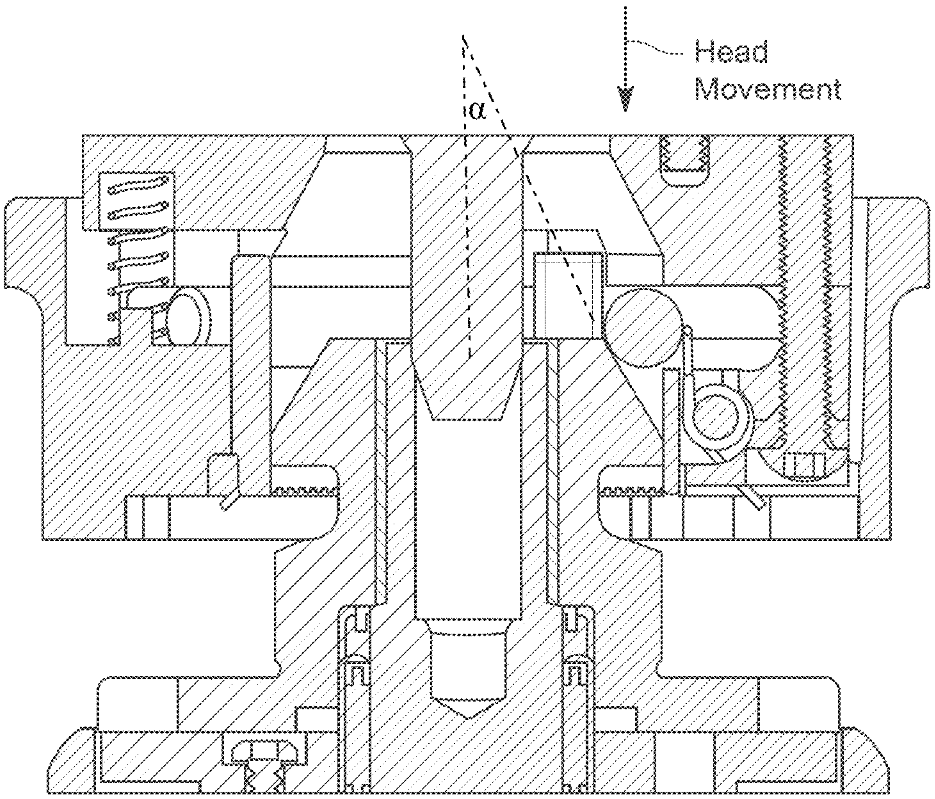
FIG. 27 shows a cross sectional view of movement of parts during the locking process of FIGS. 24-26 in accordance with an embodiment.

FIGS. 24-26 show, in cross-section, the drop and load feature, unlocked assembly, and locked assembly of the tool head element 30 onto the head interface 44 attached to main body portion 11. The collar 40 and input shaft 70 of the tool head element 30 are aligned with the central bore 58 of the head interface 44 for connection (directly or indirectly, e.g., via spindle and bearings arrangement 45 in an embodiment) to the output shaft 16 therein. As shown in FIG. 26, the attachment of the tool head element 30 onto the head interface 44 is configured to occur in a first axial direction (along axis A-A). A user aligns and applies a pushing force to the tool head element 30, i.e., pushing the tool head element 30 towards and onto the head interface 44 and thus the main body portion 11. During this action, which is illustrated in FIGS. 24, 25, and 27, for example, the locking elements 60 are configured for contact and guidance along the mating surface 56 of the head interface 44 so that the locking elements 60 are configured to slide outwardly relative to the input shaft 70, along the mating surface 56 or ramp, and against force from the biasing elements 86 (see FIG. 25). Specifically, as shown in FIG. 25, during installation and pushing of the tool head element 30 onto the main body portion, the locking elements 60 push or force the leg portions 88 of the biasing elements 86 relatively outward and away from the circumferential groove 54 (thus compressing the biasing elements 86), until the locking elements 60 are aligned with and forced into the circumferential groove 54 via the biasing elements 86. That is, once the locking elements 60 are in line with the circumferential groove 54, the tension/spring force from the leg portions 88 pushes the locking elements into the circumferential groove 54 in the radial direction.

The biasing elements (e.g., springs) 86—via at least the leg portions 88—preload the locking elements (e.g., pins) 60 against tool (i.e., head interface 44, 44A), when tool head element 30 is fully seated, and thus locked. As shown in FIG. 26, the locking elements 60 are secured within the circumferential groove 54 of the head interface 44 via leg portions 88 of the biasing elements 86. The collar springs 87 bias the collar 40 in an outmost axial position or a first collar position, relative to the tool part housing 32.

Figure 29:
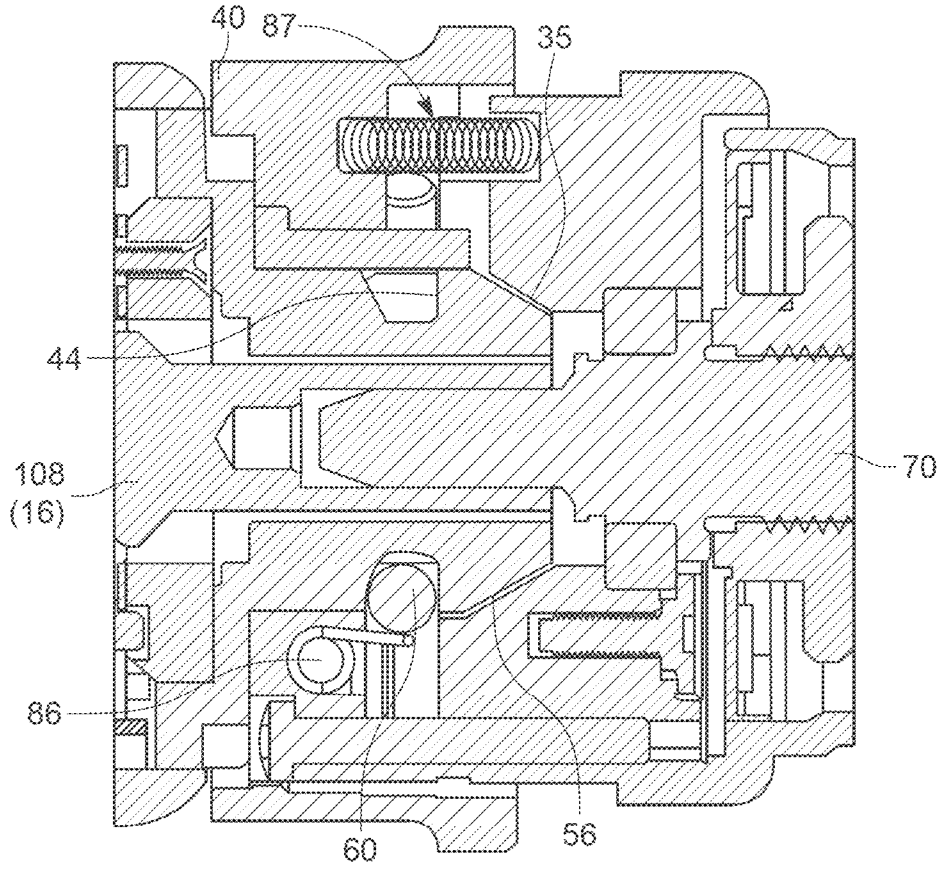
FIG. 29 shows a cross-sectional view of the locked parts in accordance with an embodiment.

FIG. 29 shows in greater detail the alignment of the parts of the power tool 10 when the tool head element 30 is attached thereto. The input shaft 70 is secured within the output shaft 16 which thus establishes a drive connection between the output shaft 16 and input shaft 70, according to embodiments. In other embodiments, the input shaft 70 is secured within the opening 122 on the second end 118 of the spindle and bearings arrangement 45, which in turn is connected to output shaft 16 (108) through its first end 116 and thus establishes a drive connection between the output shaft 16 (108) and input shaft 70. Accordingly, in either embodiment, when the motor and transmission assembly 14 of the power tool 10 is operated, the input shaft 70 is configured to rotate with the output shaft 16 (108) about the axis A-A (via bearing(s) associated therewith) and thus drive the tool head element 30 (and any associated attachments, e.g., drill bits or tools, thereon, e.g., in tool bit holder portion 23). The collar 40 is aligned with the head interface 44 and secured via the locking elements 60 and biasing elements 86. This design provides a minimal clearance between the locking elements 60 and circumferential groove 54 when the locking elements 60 are dropped in, allowing for a secured and improved fit. As shown in FIG. 29, when the tool head element 30 is engaged onto the head interface 44, the locking elements 60 fit within the circumferential groove 54 such that the locking elements 60 contact an interface surface and locking surface 53. The locking elements 60 have a small clearance relative to locking surface 55, which is able to limit axial movement. This arrangement, therefore, limits movement or wiggle room of the locking elements 60 within the groove 54.

Further, as previously noted, the interface portions 52 and 57 of the head interface 44 may be aligned to interface with the spring holder frame 42, as shown in FIG. 29. Specifically, the first interface portion 52 and the interface edge 59 of the second interface portion 57 are configured to interface with the central opening of the spring holder frame 42 when the tool head element 30 is attached to the head interface 44. Similarly, the mating surface 56 of the head interface 44 is accommodated and aligned with opening and angled wall 35 of the backing surface 36 of the tool head element 30.

Figure 31:
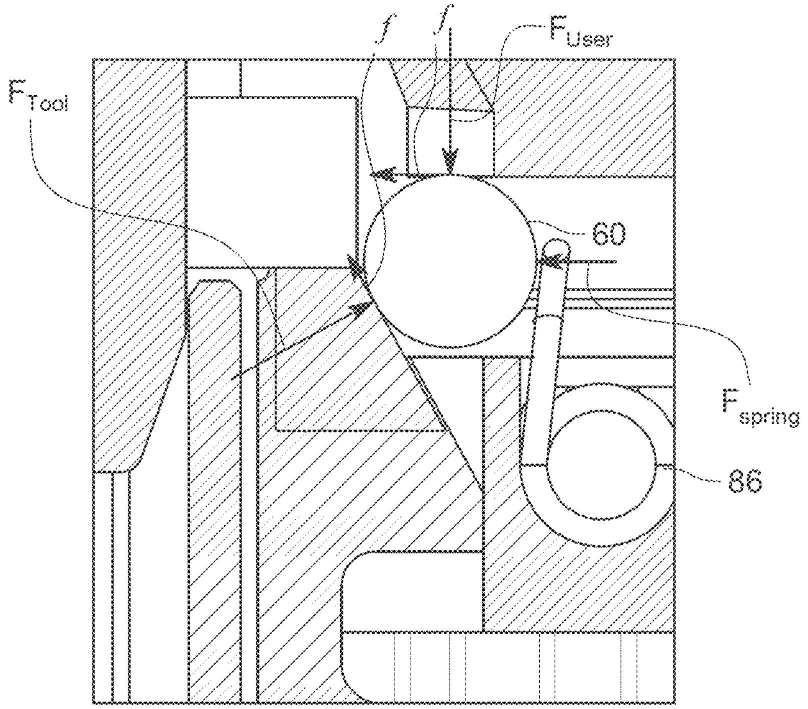
FIGS. 31-32 show, in cross sectional views, force diagrams of the forces and vectors on the locking elements during insertion or assembly and during removal or unlocking/disassembly of the tool head element in accordance with an embodiment.

FIG. 31 illustrates a force diagram of the forces applied during insertion or the drop and load action for attaching the tool head element 30 to the main body portion 11. More specifically, a detailed, cross-sectional view of elements of FIG. 24 are shown in FIG. 31, whereby the locking elements 60, biasing springs 86, et al. are contained within the collar 40 of the tool head element 30. As shown, after aligning and during pushing action of the tool head element 30 in the first axial direction, the locking elements 60 receive a force Fuser thereon in the axial direction. A biasing force Fspring from the leg portions 88 of the biasing elements 86 is also applied to the locking elements 60 in the radial direction. Force Ftool from the head interface 44 is applied at an angled direction (or diagonal direction) relative to the axis A-A from the mating surface 56 to the locking elements 60 as well. The biasing force Fspring from the leg portions 88 of biasing springs 86 is designed to be temporarily overcome (see, e.g., FIG. 25) by the Ftool and Fuser forces as the tool head element 30 is further pushed onto the head interface 44, whereby the locking elements 60 are effectively moved along the mating surface 56 to interfacing edge 59. The leg portions 88 are moved (e.g., in the illustration, rotated outwardly or counter-clockwise to tension the biasing spring 86) when forces Ftool and Fuser are applied. After passing the interfacing edge 59, the locking elements 60 are moved towards and dropped or forced into the circumferential groove 54 of the head interface 44 (as shown in FIG. 26, for example). The biasing force Fspring moves the locking elements into the groove 54 and holds the locking elements 60 in position, such that the tool head element 30 is locked onto the head interface 44 and connected to the main body portion 11 for operation.

In embodiments, the collar 40 is configured for linear movement in the axial direction at least for disengagement of the locking elements 60 and/or removal of the tool head element 30 from the head interface 44. That is, the collar 40 may be moved linearly and relatively away from the main body portion 11 for rotational or angular adjustment without removing the tool head element 30 off of the head interface 44. As mentioned previously, this movement of the collar 40 allows a user to rotate a position of the tool head element 30 via withdrawing the teeth 78 from the receiving grooves 50 and rotationally repositioning the teeth 78 into alternate receiving grooves 50, thus providing the user the ability to change to different rotational position(s) (and thus any elements associated with tool bit holder portion 23), as needed.

Figure 28:
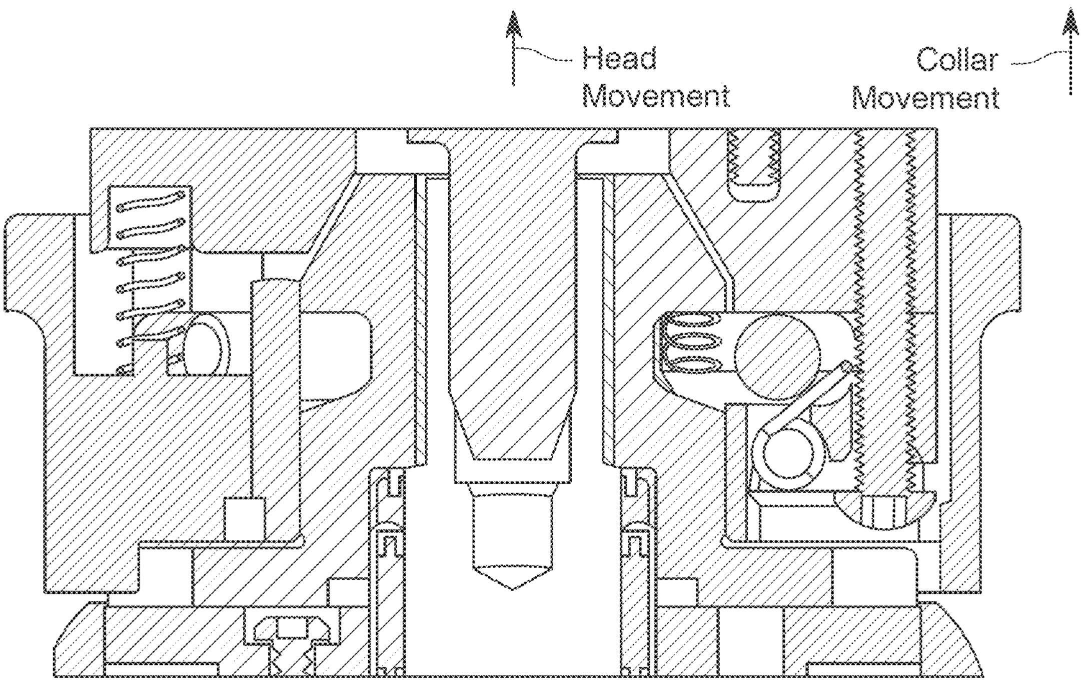
FIG. 28 shows a cross sectional view of movement of parts during a process for unlocking the tool head element from the main body portion of the power tool in accordance with an embodiment.
Figure 30:
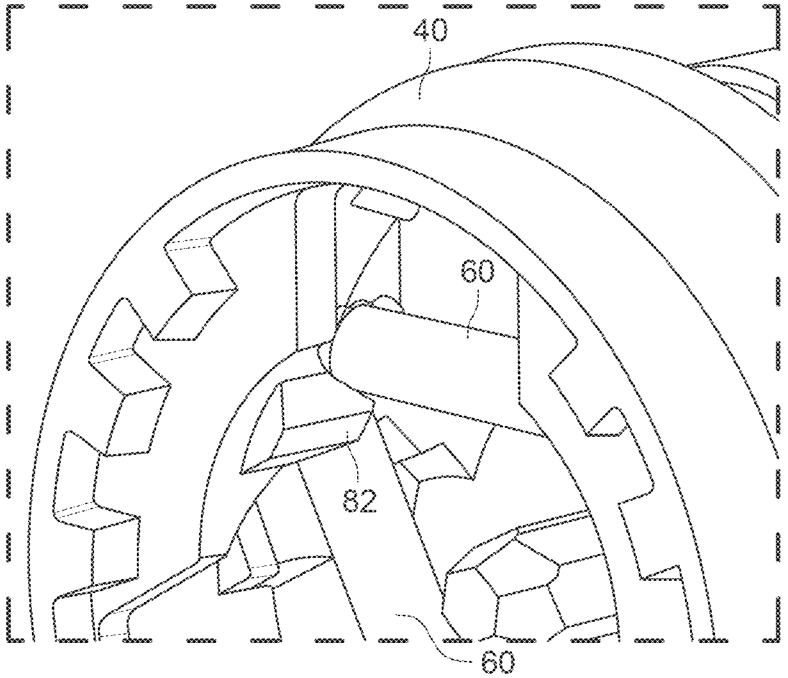
FIG. 30 shows movement of locking elements during the unlocking process of FIG. 28, from a back end, in accordance with an embodiment.

According to embodiments, removal of the tool head element 30 from the head interface 44 is configured to occur in a second axial direction that is opposite to the first axial direction. That is, a user moves the collar axially and also applies a pulling force on the collar 40 of the tool head element 30, i.e., pulling both the collar 40 and tool head element 30 away from the main body portion 11. This movement works against the biasing force of the collar springs 87 and allows axial movement of the collar 40 away from its first or outmost axial position, to a second collar position. Such axial movement of the collar 40 results in a force that pushes the locking elements 60 relatively outwardly from the circumferential groove 54 and against forces of the biasing elements 86. As shown in FIGS. 28 and 30, pulling the collar 40 away from the tool results in compression of the biasing element(s) 86 by way of the locking elements 60 being moved outwardly relative to the central axis A-A.

As noted with regards to FIGS. 13-14, the locking elements 60 are configured to move from the bottom wall 82 and up along the ramped surface 80 when the collar 40 and tool head element 30 are pulled and moved axially (linearly) in the second direction. Specifically, locking elements 60 are moved along the ramped surface 80 and towards the wedge elements 84. FIG. 30 shows how wedge elements 84 are configured to drive or push locking elements 60 outwardly relative to the axis A-A and to move the locking elements 60 out of the circumferential groove 54 of the head interface 44. By moving the locking elements 60 outside of the outer diameter of the interfacing edge 59 and moving leg portions 88 of the biasing elements 86, then, as shown in FIG. 28, the locking elements 60 are free to move out of the groove 54 and along the edge 59. As such, this thereby enables movement of the tool head element 30 axially away from the head interface 44 and thus removal of the tool head element 30 from the main body portion 11.

Figure 32:
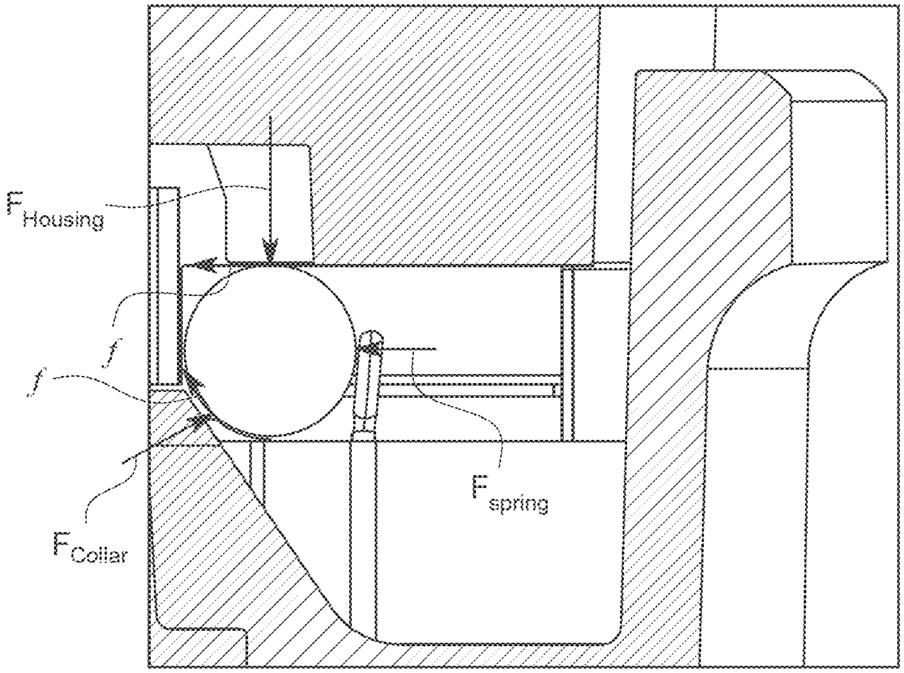

FIG. 32 illustrates a force diagram of the forces applied during removal and unlocking of the tool head element 30 from the main body portion 11. Such forces are similar to those described with respect to FIG. 31, working in an opposite manner. As shown, during pulling action of the tool head element 30 in the second axial direction, while biasing force Fspring from the leg portions 88 of the biasing elements 86 is applied in the radial direction, the locking elements 60 receive a force Fhousing thereon in the axial direction, as well as a force Fcollar from the collar applied at an angled direction (or diagonal direction) relative to the axis A-A. As the collar 40 and tool head element 30 are moved (see FIG. 28) in the second axial direction, the biasing force Fspring from the leg portions 88 of the biasing elements 86 is temporarily overcome and the locking elements 60 are able to move out of the circumferential groove 54. Accordingly, the Fhousing and Fcollar forces overcome the biasing force Fspring so that the tool head element 30 is moved away from the head interface 44. During removal, force Ftool from the head interface 44 is applied at an angled direction along with force from the mating surface 56 to the locking elements 60 until the tool head element 30 fully removed.

Figure 33:
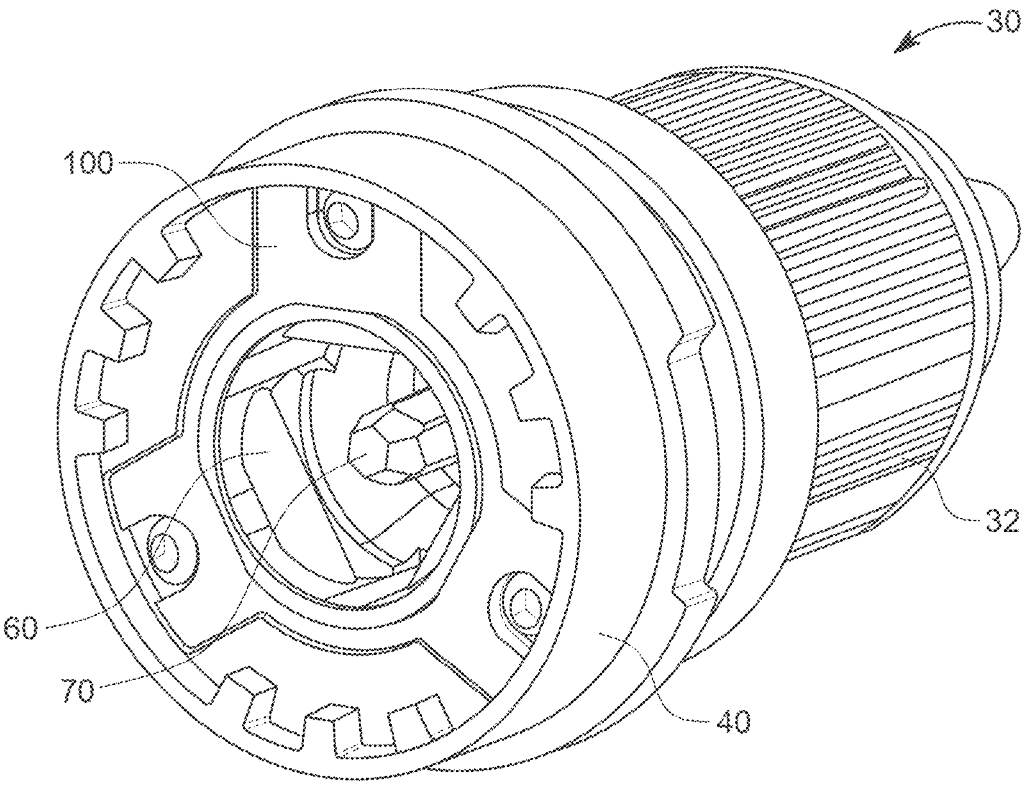
FIG. 33 shows a first angled view of a hex shaped shaft of the tool head element used with the power tool of FIG. 1 in accordance with an embodiment.
Figure 34:
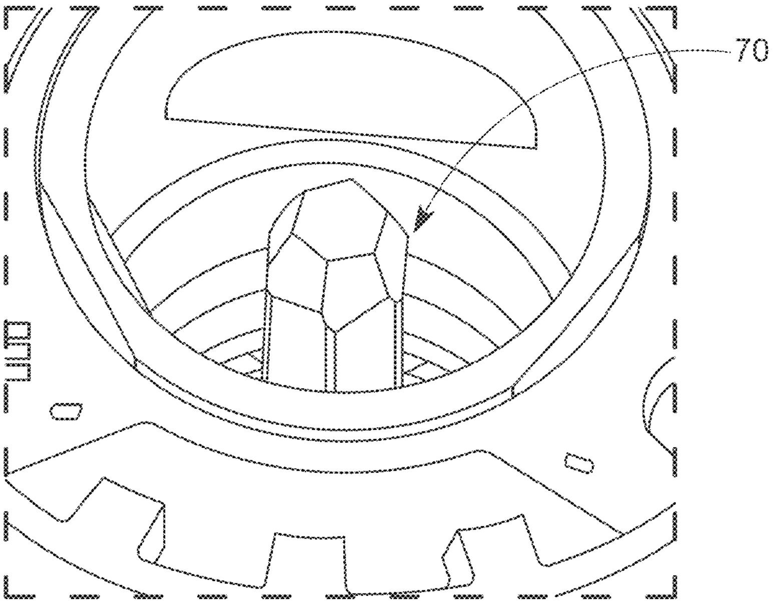
FIG. 34 shows a detailed view of the hex shaped shaft within the collar and tool head element of FIG. 33.
Figure 35:
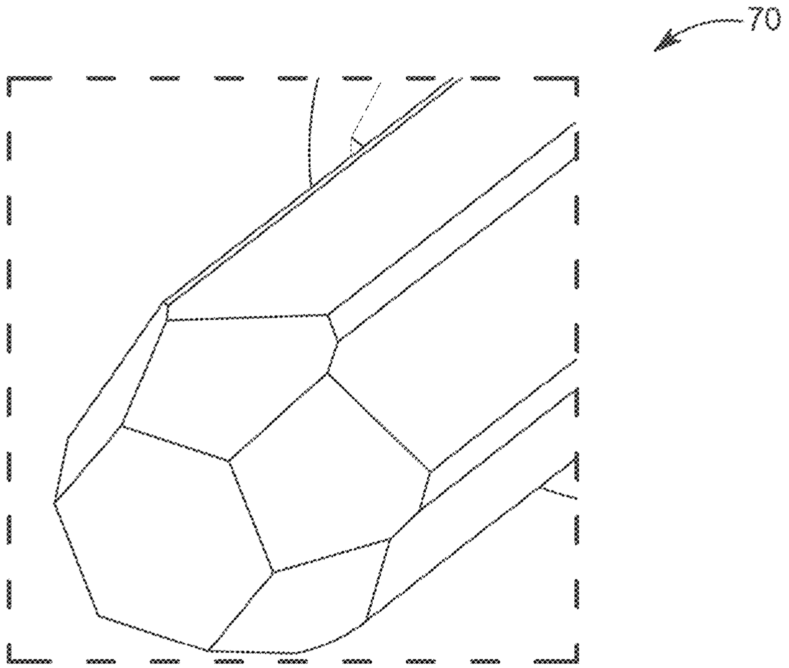
FIG. 35 shows an isometric view of the hex shaped shaft in accordance with an embodiment.
Figure 36:
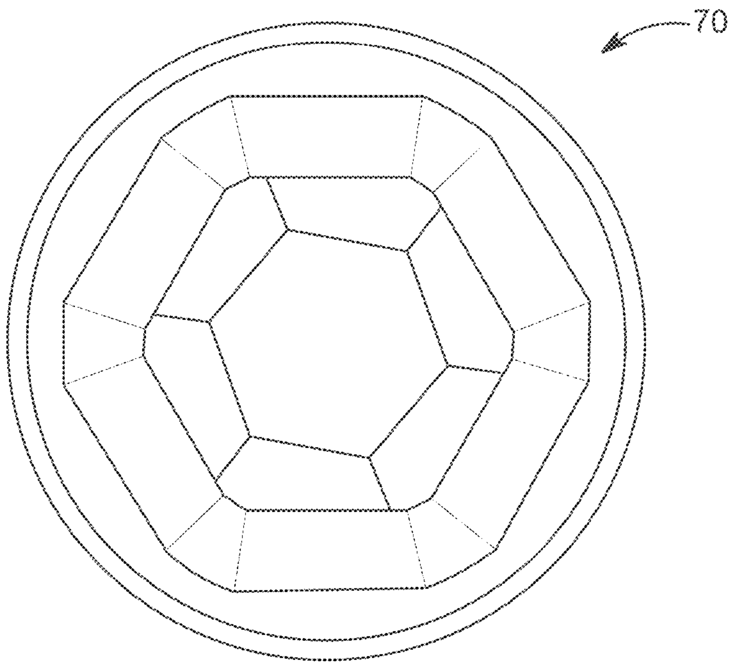
FIG. 36 shows an end view of the hex shaped shaft in accordance with an embodiment.

Turning now to FIGS. 33-37B, an exemplary input shaft 70 of the tool head element 30 is illustrated. As previously noted (and shown in FIG. 10, for example), the input shaft 70 has at least one bearing associated therewith and provided within the housing of the tool head element 30 for guiding rotation thereof when assembled for operation. FIG. 33 shows a first angled view of the input shaft 70, with a lead-in end of angled hex edges, provided in the form of a hex shaped shaft in accordance with an embodiment. FIG. 34 shows a detailed view of the hex shaped shaft. In such an embodiment, the shape of the connecting hex on the input shaft 70 of the tool head element 30 is altered to make it easier for lining up with the main body portion 11 and its output shaft 16/108. In particular, the hex shapes at the lead-in end allows for self-alignment of the input shaft 70 within the opening of output shaft 16 or receiving opening 122 of spindle body 108, when being attached to the main body portion 11. As seen in FIGS. 35-36, the input shaft 70 has a general hex shape along its body (extending along a shank portion) providing six edges or surfaces, whereas an end portion or lead-in end (at the front point) of the shaft 70 has smaller hex edges rotated relative to each other and to the hex edges of the body. More specifically, the shank of the input shaft 70 is generally hexagonal in shape as it extends from the tool head element 30, wherein the hex edges of the lead-in end are rotated relative to a central axis of the shank. The hex edges are provided at a depth at a front/lead end portion of the input shaft 70. In an embodiment, the smaller hex edges are rotated between 5 degrees to 45 degrees relative to the six edges of the body and central axis of the input shaft. In one embodiment, the smaller hex edges are rotated by about 10 degrees to 15 degrees relative to the edges of the body. In another embodiment, the smaller hex edges are rotated 30 degrees or less relative to the edges of the body. The depth or length of the cut hex edges extending from the front point of the lead-in end is not intended to be limiting, and are designed to be provided at a depth or length along the shaft without limiting length.

Figure 37B:
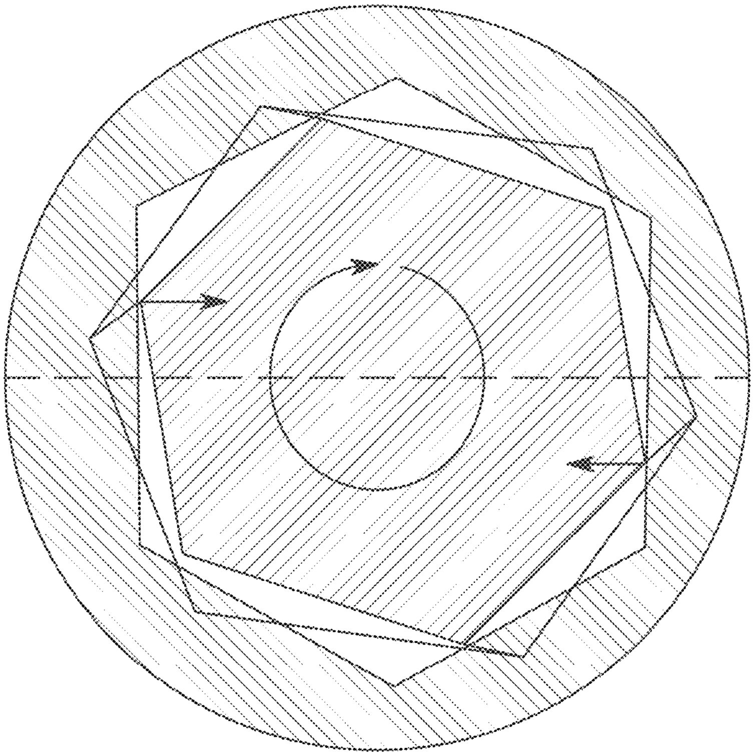
FIGS. 37A-37B show an interaction of the hex shaped shaft and output shaft in accordance with an embodiment.
Figure 37A:
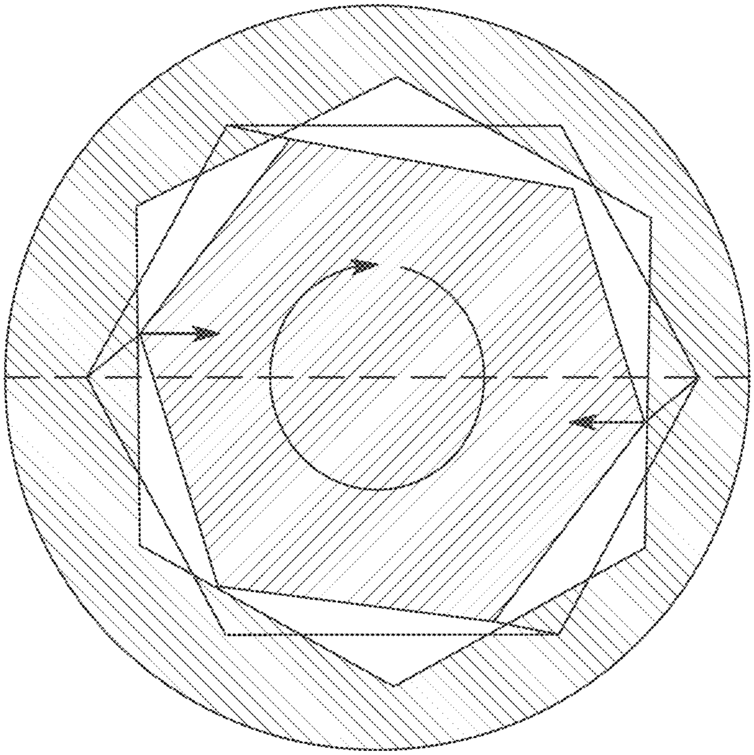

When aligning the input shaft 70 (male hex) into the head interface 44 and thus output shaft 16/108 (female hex), then, there is a less likelihood of misalignment and locking up of the tool head element 30, since the hex shaped input shaft 70 provides an allowance for force and rotation. The lead-in edge with smaller hex edges are designed for insertion into the output shaft/spindle 16, 108. As illustrated in FIGS. 37A-37B, an interaction between hexes of the input shaft 70 and the inside of output shaft 16, 108 creates a moment due to imbalance of forces. As consistent push force is applied, the hex input shaft 70 rotates and creates a positive feedback loop as the moment arm grows. That is, since the hex input shaft 70 is provided on a bearing (within tool head element 30), the push force from a user while attaching tool head element 30 will allow slight rotation (or spinning) of the hex input shaft 70, as shown, for alignment of the input shaft 70 within the output shaft 16, 108. In embodiments, a user may apply power to power chuck (via trigger) and spin the output shaft 16, 108 to rotate the shaft(s) for alignment.

Accordingly, alignment is easier. Further, as consistent force is applied, the hex of input shaft 70 rotates and creates a positive feedback loop as the moment arm grows.

The attachment of head interface 44 to the tool head element 30 generates a relative torque between an input shaft 70 and output shaft 16 when a rotational force is applied thereto (e.g., via activation of the motor of the power tool 10). Although the input shaft 70 is shown in the Figures as a having a particular number of surfaces on the lead-in end, such surfaces are not limited to hexagonal features. In another embodiment, the lead-in end of the input shaft 70 may include alternative compound 3D surface features that enable self-locking and/or self-alignment features, which may include other angles or shapes, for the connection.

Accordingly, it should be understood that, according to embodiments herein, this disclosure provides a power tool including: a housing; a motor and transmission assembly received in the housing; a trigger for activating the motor and transmission assembly; an output shaft driven by the motor and transmission assembly via a back end thereof for rotation about an axis; a head interface coupled to a forward end of the output shaft, the head interface including a mating surface and a circumferential groove; a tool head element configured for selective engagement on the head interface, the tool head element including: a housing including an input shaft configured to removably couple with the output shaft; and a collar having a plurality of locking elements, each locking element being biased inwardly towards the input shaft by biasing elements; wherein, upon attachment of the tool head element to the head interface, the plurality of locking elements are aligned into the circumferential groove of the head interface and held by the biasing elements therein to engage the tool head element onto the head interface and establish a drive connection between the output shaft and input shaft such that, when the motor and transmission assembly of the power tool is operated, the input shaft is configured to rotate with the output shaft about the axis and thus drive the tool head element.

In exemplary embodiments, the attachment of the tool head element onto the head interface is configured to occur in a first axial direction and wherein the plurality of locking elements are configured to be guided along the mating surface of the head interface so that the locking elements are configured to slide outwardly relative to the input shaft and against force from the biasing elements until the plurality of locking elements are aligned with and forced into the circumferential groove via the biasing elements.

In exemplary embodiments, removal of the tool head element from the head interface is configured to occur in a second axial direction that is opposite to the first axial direction, and wherein the collar is configured for axial movement between a first collar position and a second collar position, such that the axial movement of the collar results in a force that pushes the plurality of locking elements relatively outwardly from the circumferential groove and against forces of the biasing elements, thereby enabling movement of the tool head element axially away from the head interface.

According to exemplary embodiments herein, the collar further includes at least one ramped surface and wedging element therein extending radially towards a center thereof for pushing the plurality of locking elements relatively outwardly from the circumferential groove and against forces of the biasing elements.

In exemplary embodiments, the biasing elements are torsion springs.

In exemplary embodiments, the circumferential groove is provided axially behind the mating surface.

In exemplary embodiments, the plurality of locking elements includes pins or rolling elements.

In exemplary embodiments, the mating surface extends circumferentially around a bore in the head interface that is configured to receive the output shaft therein.

In exemplary embodiments, the mating surface of the head interface is a tapered surface or chamfered surface. According to non-limiting and exemplary embodiments herein, when a taper surface is included, the tapered surface is provided at an angle of about 45 degrees relative to the axis.

In exemplary embodiments, the tool head element further includes a housing with a backing plate and biasing elements positioned between the collar and the backing plate.

In exemplary embodiments, the collar further includes teeth configured to engage corresponding receiving grooves on the head interface; wherein, the collar is configured for linear movement in an axial direction for disengagement of the tool head element from the head interface and wherein the collar is further configured for rotational movement about the axis, without removing the tool head element off of the head interface, to rotate a position of the tool head element via withdrawing the teeth from the receiving grooves and rotationally repositioning the teeth into the receiving grooves.

In exemplary embodiments, in the power tool, the input shaft comprises a hex shaped interface.

In exemplary embodiments, in the power tool, the head interface is coupled to the output shaft via a spindle and bearings arrangement, a first end of the spindle and bearings arrangement being configured for insertion into an opening in the housing for attachment to the forward end of the output shaft and a second end of the spindle and bearings arrangement being configured for insertion into a bore of the head interface.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments. Further, it is intended that embodiments of the disclosed subject matter cover modifications and variations thereof.

While the principles of the disclosure have been made clear in the illustrative embodiments set forth above, it will be apparent to those skilled in the art that various modifications may be made to the structure, arrangement, proportion, elements, materials, and components used in the practice of the disclosure.

It will thus be seen that the features of this disclosure have been fully and effectively accomplished. It will be realized, however, that the foregoing preferred specific embodiments have been shown and described for the purpose of illustrating the functional and structural principles of this disclosure and are subject to change without departure from such principles. Therefore, this disclosure includes all modifications encompassed within the spirit and scope of the following claims.

What is claimed is:

1. A power tool comprising:

a housing;

a motor and transmission assembly received in the housing;

a trigger for activating the motor and transmission assembly;

an output shaft driven by the motor and transmission assembly via a back end thereof for rotation about an axis;

a head interface coupled to a forward end of the output shaft, the head interface comprising a mating surface and a circumferential groove;

a tool head element configured for selective engagement on the head interface, the tool head element comprising:

a housing including an input shaft configured to removably couple with the output shaft; and a collar comprising a plurality of locking elements, each locking element being biased inwardly towards the input shaft by biasing elements;

wherein, upon attachment of the tool head element to the head interface, the plurality of locking elements are aligned into the circumferential groove of the head interface and held by the biasing elements therein to engage the tool head element onto the head interface and establish a drive connection between the output shaft and input shaft such that, when the motor and transmission assembly of the power tool is operated, the input shaft is configured to rotate with the output shaft about the axis and thus drive the tool head element.

2. The power tool according to claim 1, wherein the attachment of the tool head element onto the head interface is configured to occur in a first axial direction and wherein the plurality of locking elements are configured to be guided along the mating surface of the head interface so that the locking elements are configured to slide outwardly relative to the input shaft and against force from the biasing elements until the plurality of locking elements are aligned with and forced into the circumferential groove via the biasing elements.

3. The power tool according to claim 2, wherein removal of the tool head element from the head interface is configured to occur in a second axial direction that is opposite to the first axial direction, and wherein the collar is configured for axial movement between a first collar position and a second collar position, such that the axial movement of the collar results in a force that pushes the plurality of locking elements relatively outwardly from the circumferential groove and against forces of the biasing elements, thereby enabling movement of the tool head element axially away from the head interface.

4. The power tool according to claim 1, wherein the biasing elements are torsion springs.

5. The power tool according to claim 1, wherein the circumferential groove is provided axially behind the mating surface.

6. The power tool according to claim 1, wherein the plurality of locking elements comprise pins or rolling elements.

7. The power tool according to claim 1, wherein the mating surface extends circumferentially around a bore in the head interface that is configured to receive the output shaft therein.

8. The power tool according to claim 1, wherein the mating surface of the head interface is a tapered surface or chamfered surface.

9. The power tool according to claim 8, wherein the tapered surface is provided at an angle of about 45 degrees relative to the axis.

10. The power tool according to claim 1, wherein the tool head element further comprises a housing with a backing plate and biasing elements positioned between the collar and the backing plate.

11. The power tool according to claim 1, wherein the collar further comprises teeth configured to engage corresponding receiving grooves on the head interface;

wherein, the collar is configured for linear movement in an axial direction for disengagement of the tool head element from the head interface and wherein the collar is further configured for rotational movement about the axis, without removing the tool head element off of the head interface, to rotate a position of the tool head element via withdrawing the teeth from the receiving grooves and rotationally repositioning the teeth into the receiving grooves.

12. The power tool according to claim 3, wherein the collar further comprises at least one ramped surface and wedging element therein extending radially towards a center thereof for pushing the plurality of locking elements relatively outwardly from the circumferential groove and against forces of the biasing elements.

13. The power tool according to claim 1, wherein the input shaft comprises a hex shaped interface.

14. The power tool according to claim 1, wherein the head interface is coupled to the output shaft via a spindle and bearings arrangement, a first end of the spindle and bearings arrangement being configured for insertion into an opening in the housing for attachment to the forward end of the output shaft and a second end of the spindle and bearings arrangement being configured for insertion into a bore of the head interface.

* * * * *